United States Patent [19]

Melton et al.

[11] Patent Number: 5,627,747
[45] Date of Patent: May 6, 1997

[54] SYSTEM FOR DEVELOPING AND OPERATING AN ACTIVE SOUND AND VIBRATION CONTROL SYSTEM

[75] Inventors: Douglas E. Melton, Stoughton; James E. Allard, Madison; Brian M. Finn, Madison; Jerry J. Trantow, Madison; Steven R. Popovich, Stoughton; Trevor A. Laak, Madison; Mark C. Allie, Oregon; Larry J. Eriksson, Madison, all of Wis.

[73] Assignee: Digisonix, Inc., Madison, Wis.

[21] Appl. No.: 322,585

[22] Filed: Oct. 13, 1994

[51] Int. Cl.⁶ ................................................. G06F 19/00
[52] U.S. Cl. ........................ 364/188; 364/191; 364/508
[58] Field of Search ................................. 364/188, 189, 364/191–193, 148, 505, 506, 508, 578, DIG. 1 MS File, DIG. 2 MS File; 395/500, 155–161

[56] References Cited

U.S. PATENT DOCUMENTS

| | | | |
|---|---|---|---|
| 4,663,704 | 5/1987 | Jones et al. | 364/146 X |
| 4,862,506 | 8/1989 | Landgarten et al. | 381/71 |
| 4,870,561 | 9/1989 | Love et al. | 364/192 |
| 5,168,441 | 12/1992 | Onarheim et al. | 364/188 X |
| 5,247,693 | 9/1993 | Bristol | 395/800 |
| 5,313,399 | 5/1994 | Beale | 364/508 X |
| 5,371,895 | 12/1994 | Bristol | 395/800 X |
| 5,426,720 | 6/1995 | Bozich et al. | 364/508 X |

OTHER PUBLICATIONS dSPACE article entitled "About dSPACE", published by Digital Signal Processing and Control Engineering GmbH, 1993.

Comdyna, Inc. advertisement; Barrington, Illinois 60010; Date Unknown.

*Primary Examiner*—Joseph Ruggiero
*Attorney, Agent, or Firm*—Andrus, Sceales, Starke & Sawall

[57] ABSTRACT

A system that facilitates the development and operation of active sound or vibration control systems, especially for those not skilled in computer programming. The system facilitates the development of developing active sound or vibration control systems implementing an adaptive control model. In particular, the system has a software collection containing control system software that implements an adaptive control model which can be programmed on an electronic controller to actively control sound or vibration. The system also has a user interface that prompts the user to enter information pertaining to the control system being developed so that the electronic controller can implement an adaptive control model in accordance with the information entered by the user.

41 Claims, 14 Drawing Sheets

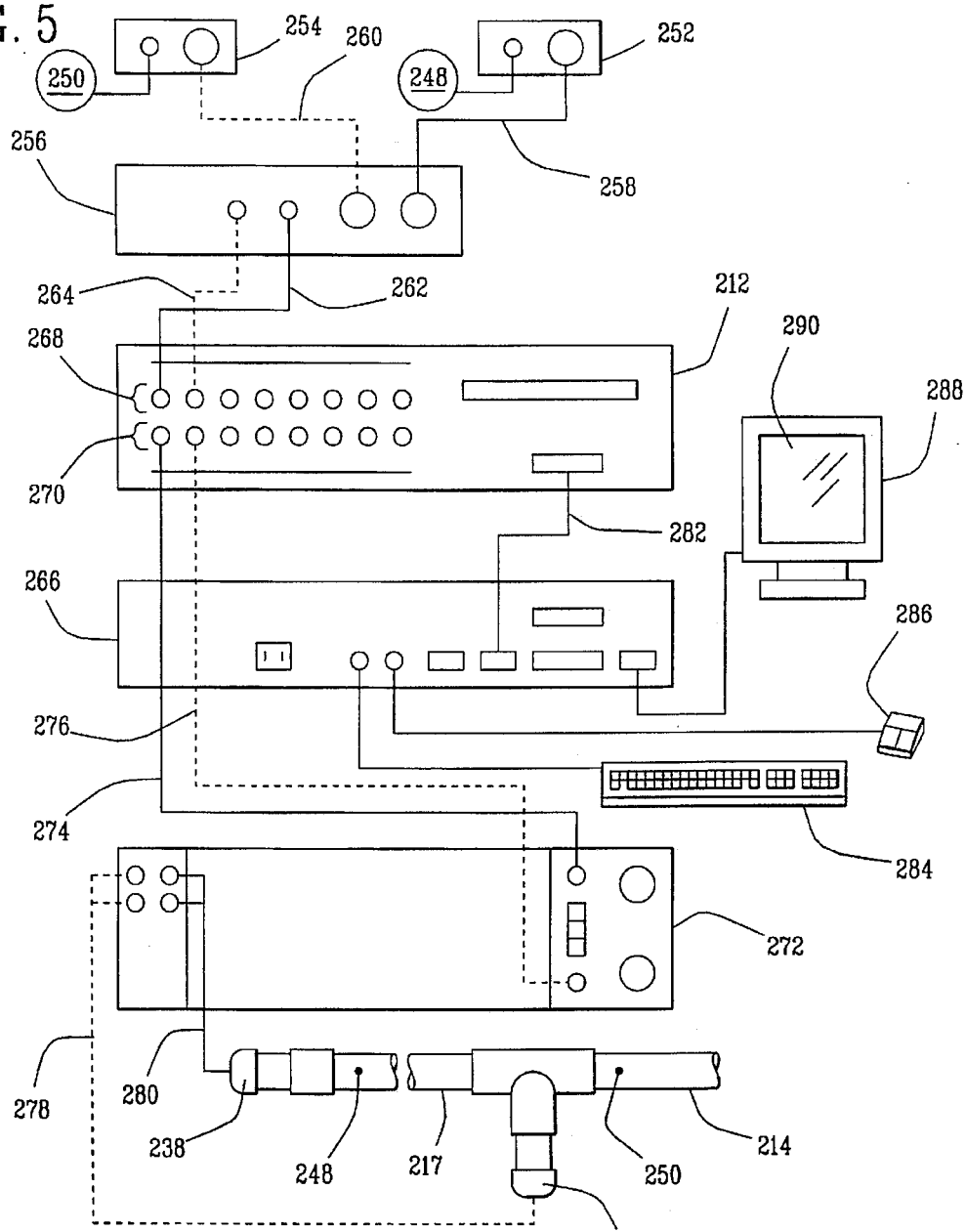
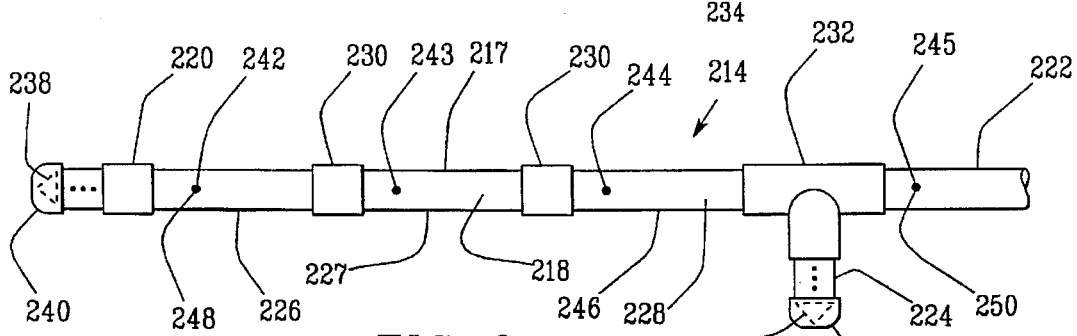

SYSTEM FOR DEVELOPING AND OPERATING AN ACTIVE SOUND AND VIBRATION CONTROL SYSTEM

FIELD OF THE INVENTION

The present invention relates to software and hardware for developing and operating active sound and vibration control systems. The invention is particularly useful for educating users in the development and operation of active sound and vibration control systems.

BACKGROUND OF THE INVENTION

The development and operation of active sound and vibration control systems requires a wealth of information and technology in several areas of engineering and science. It requires skill, technology and knowledge relating to the physical system being controlled (i.e. the plant), to control techniques, to mechanical and electronic control hardware, and to computer programming.

Consider, for example, an active sound control system in which the physical system being controlled is an acoustic plant receiving input acoustic waves. Canceling acoustic waves are introduced into the plant to destructively interfere with and cancel the input acoustic waves so that the amplitude of output acoustic waves from the plant are reduced. In such an active sound control system, it is typical to sense input acoustic waves with one or more input transducers (e.g. input microphones) and sense output acoustic waves with one or more error transducers (e.g. error microphones). The input transducers supply an input or feedforward signal to an electronic controller, and the error transducers supply an error or feedback signal to the electronic controller. The electronic controller is programmed with a control model that models the plant and filters the signals from the transducers (e.g. microphones) to generate a correction signal. The correction signal is supplied to an actuator (e.g. a canceling loudspeaker); and, in response to the correction signal, the actuator introduces canceling acoustic waves to destructively interfere the input acoustic waves.

In some ways, active sound control systems are similar to active vibration control systems. Active vibration control systems normally attenuate mechanical vibrations in a mechanical structure, or otherwise restrict unwanted movement of a mechanical structure. Typically, active vibration control systems have transducers that measure or predict mechanical movement in a structure and generate corresponding signals that are transmitted to an electronic controller (e.g. with accelerometers or other means known in the art). The electronic controller is programmed to model the plant (i.e. the structure), and filter the signals to generate a correction signal that is supplied to one or more output actuators (e.g. electromechanical shakers). Forces introduced by the output actuators cancel or lessen the unwanted mechanical movements.

For both active sound control systems and active vibration control systems, it is important that the electronic controller be able to properly model the physical system being controlled (i.e. the plant). In other words, it is important that the electronic controller properly filter input and error signals to generate an appropriate correction signal. It is also important that. the mechanical and electronic control hardware be properly installed and calibrated.

In most applications, the configuration of the control hardware and the configuration of the control model of the plant in the electronic controller need to be customized. Properly customizing the design of an active control system depends on considerations such as the properties of the physical system being controlled (i.e. the plant), the type of outside influences on the physical system, and the required performance of the control system. For instance, some applications require that certain types of control techniques be incorporated into the control model programmed on the electronic controller, while other applications require other types of control techniques. A particularly effective control technique in many applications requires the use of an adaptive recursive filter in the electronic controller.

Since active systems need to react to changes occurring in the physical system or to changes occurring to the inputs into the physical system, there is often a trade-off between the accuracy of the control model programmed on the electronic controller and the speed of the model. This trade-off can be lessened by optimizing the efficiency of executable code implementing the control model on the electronic controller.

The electronic controller is typically programmed by downloading executable code containing a control model and other control system software from a host computer via a communications link. In such a system, the host computer normally communicates with the electronic controller over the communications link even after the electronic controller is programmed. In this manner, the host computer can access the electronic controller in real-time for a variety of purposes that are useful for developing and analyzing the control system. For instance, selected information from the electronic controller can be viewed in real-time on a monitor of the host computer. Also, in some systems certain operation parameters on the electronic controller can be changed or modified by commands from the host computer. This allows users to control the operation of the electronic controller in real-time.

The process of developing appropriate and optimized executable code for the electronic controller normally involves editing computer source code in a text editor on the host computer. Then recompiling and relinking the edited source code on the host computer and downloading the executable code from the host computer to the electronic controller. This reprogramming is done repeatedly until the executable code is optimized, and also properly models the plant and otherwise operates the control system. The iterative process for developing optimized executable code to model the plant and otherwise operate the control system is a formidable task, which is virtually undoable for an engineer that does not know the programming language used on the host computer. Even for an engineer that is an experienced computer programmer, the re-programming process can be time consuming.

Another difficulty with the development and operation of active sound and vibration control systems is that engineers or scientists designing such systems need to be skilled in the use of control system hardware and software, and also need to be skilled in the technical areas relating to the physical system being controlled. For instance, they need skill in control systems, computer programming, and in how acoustics or mechanical vibrations behave in the particular application. Training and educating engineers and scientists so they have a sufficient background in each of these areas takes considerable time and devotion, and in some cases makes the development of sound and vibration control systems cost prohibitive. Sometimes a few engineers and scientists on a development team are sufficiently skilled in all the required areas, but even then it is difficult to train and educate others on the development team.

SUMMARY OF THE INVENTION

The present invention is a system and a method that makes developing and operating active sound or vibration control systems easier, especially for those not skilled in computer programming. The invention is particularly well-suited for developing active sound or vibration control systems implementing an adaptive control model. The invention also facilitates effective communication between skilled and knowledgeable users to others with less skill and knowledge.

In one aspect, the invention is a system providing a software collection containing control system software that implements an adaptive control model which can be programmed on an electronic controller for use in an active sound vibration control system. The system preferably has a user interface that prompts a user to enter information pertaining to the control system being developed, a code generator that generates executable code from software in the collection in accordance with information entered by the user, and a loader that loads the executable code onto the electronic controller. The electronic controller can then be operated in accordance with the executable code. It is preferred that the user interface have one or more menus for receiving user information. The user interface can be a graphical user interface that displays a control model diagram of the control model being developed. Such a control model diagram should be comprised of separate parts, and each of the separate parts should have an associated part menu that prompts the user to enter information pertaining to the associated part.

The system preferably uses a C compiler and the C programming language. The code generator generates the executable code by creating a header file of C source code corresponding to the information entered by the user, and compiling and linking the header file with the control system software in the software collection.

The system can have a graphical editor that displays the control model diagram on the screen of a host computer, and allows the control model diagram to be edited by adding parts to, deleting parts from, and moving parts in the control model diagram. In this manner, an experienced programmer can begin with a generalized control model diagram representing, for example, an adaptive generalized recursive control model, and modify the control model diagram to express a customized control model. Then the experienced programmer can create or edit customized source code in the software collection to correspond to the customized control model diagram. The system can also have a means for editing the user interface so that the user interface corresponds with customized source code.

In another aspect, the invention provides a test plant for an active sound or vibration control system so that the electronic controller can be operated in accordance with executable code implementing a control model in a controlled environment. Such a system preferably has fundamental mechanical and electronic control hardware so that a user can operate an entire active control system in the controlled environment.

In yet another aspect, the invention is a system similar to that described above wherein the user interface also prompts the user to enter information pertaining to a plant simulation model that is programmed on to the electronic controller. This facilitates faster learning and system development because the electronic controller operates in accordance with a simulated plant model, rather than a physical plant which requires set-up.

It is also contemplated that the invention be used in combination with a real-time monitoring and control system in which a host computer communicates with the electronic controller. Such an overall system provides an effective development and learning tool for active sound and vibration control systems.

An object of the invention is to facilitate the use of adaptive recursive control techniques in the development of active sound or vibration control system. The invention accomplishes this object by providing a software collection that implements an adaptive control model that can be customized to a particular application. The adaptive control model can be an adaptive feedforward recursive control model, an adaptive feedback recursive control scheme, or an adaptive generalized recursive control model; but it is not necessary that the adaptive control model be an adaptive recursive control model.

Another object is to facilitate the development and operation of active sound and vibration control systems for non-programmers. The invention accomplishes this object by providing a code generator with a user interface that prompts the user for information needed to generate executable code for the electronic controller.

Another object is to facilitate educational training of users in active sound and vibration control systems. The invention achieves this object in many ways. Providing plant simulation software and a physical test plant are especially important because these features facilitate user practice.

Another object is to facilitate the communication of development of particular active sound and vibration control systems from experienced users to novice users. The invention achieves this object by allowing experienced users to generate graphical representations of control model diagrams with corresponding menus that are useful for describing the control model and for generating executable code from source code written by the experienced user.

Other objects of the invention are apparent from the following discussion.

BRIEF DESCRIPTION OF THE DRAWINGS

FIG. 5 is a schematic drawing showing the electrical interconnection between the hardware components shown in FIG. 4.

FIG. 6 is a schematic drawing showing a test duct assembly in accordance with the invention.

DETAILED DESCRIPTION OF THE PREFERRED EMBODIMENT

Figure 1:
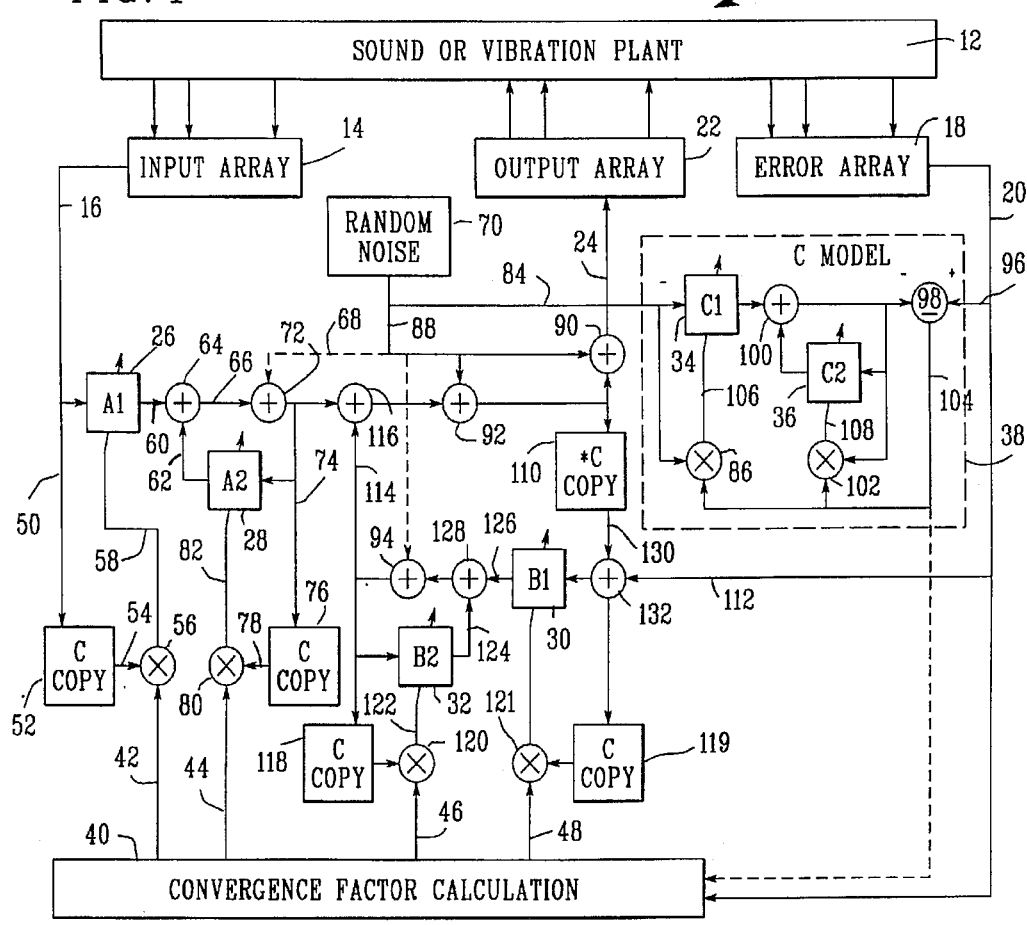
FIG. 1 is a schematic drawing of an adaptive generalized recursive control model for active sound or vibration control in accordance with the invention.
Figure 2:
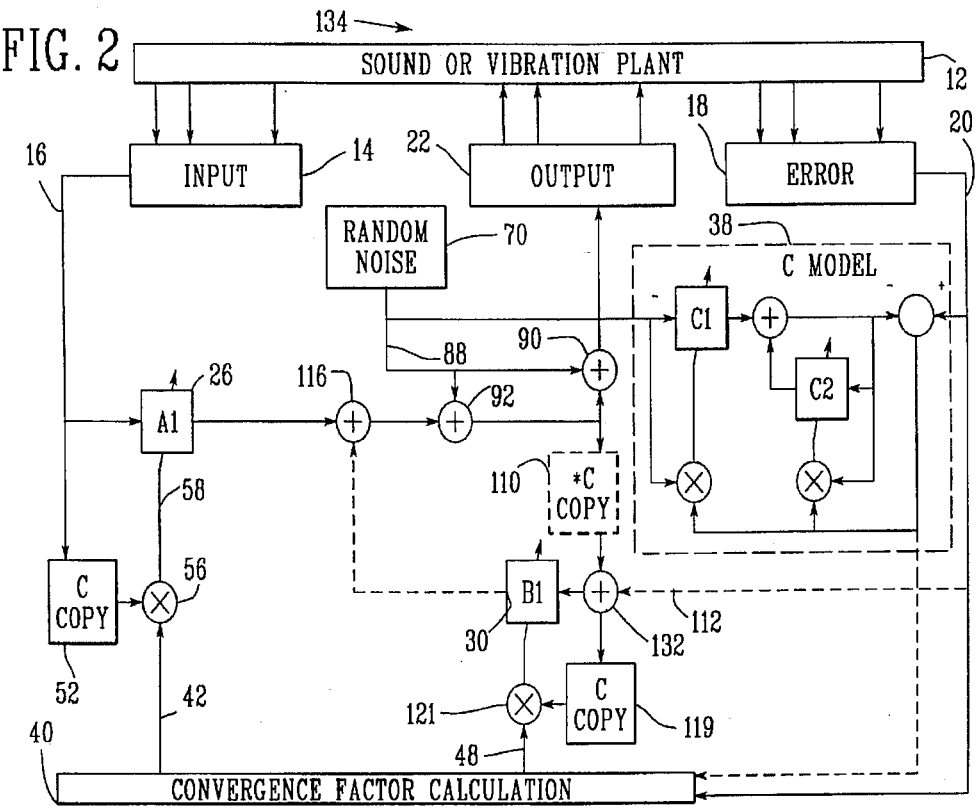
FIG. 2 is a schematic drawing of an adaptive feedforward recursive control model for active sound or vibration control in accordance with the invention.
Figure 3:
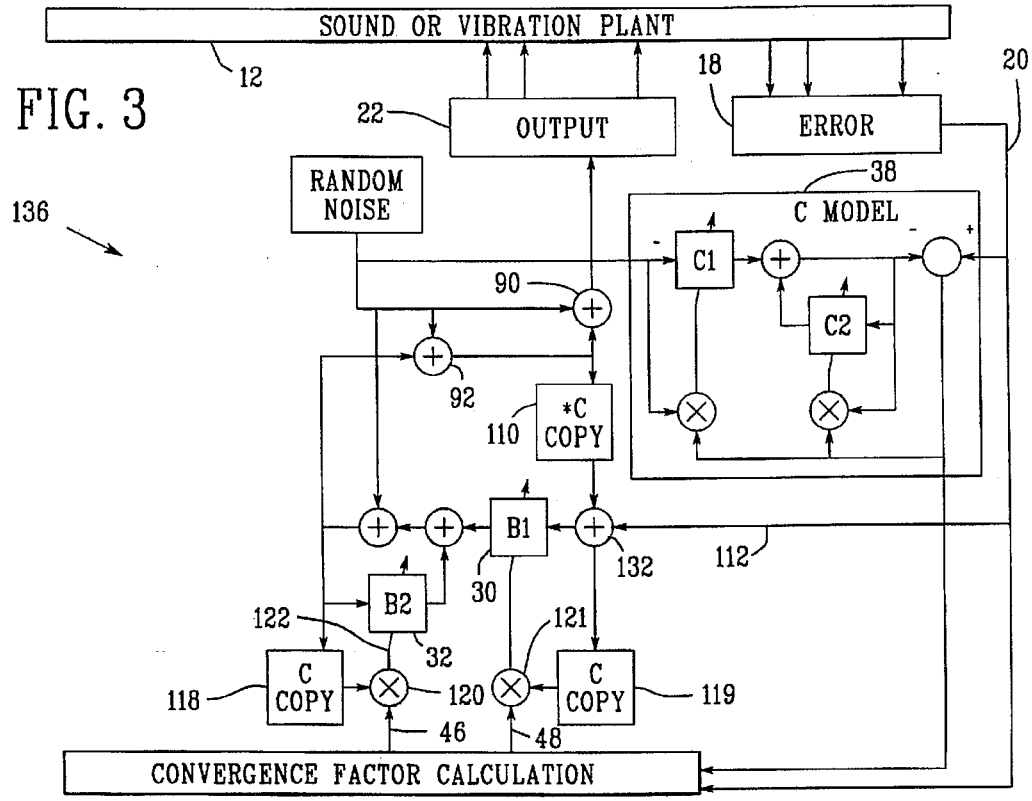
FIG. 3 is a schematic drawing of an adaptive feedback recursive control model for active sound or vibration control in accordance with the invention.

The invention is a system 10 for developing and operating active sound and vibration control systems that preferably uses a fully adaptive control model. It is preferred that the fully adaptive control model be a fully adaptive recursive control model. The system 10 has hardware components and software components. Fully adaptive recursive control models are illustrated in FIGS. 1–3. Hardware components of the system 10 are shown in FIGS. 4–8. The software components are shown schematically in FIGS. 9–14, and FIGS. 15a–15b.

Adaptive Recursive Control Model

FIG. 1 is a schematic representation of a fully adaptive generalized recursive control model 11 for an active sound or vibration control system. The model 11 adaptively models a sound or vibration plant 12. FIG. 1 illustrates an array 14 of input sensors that sense an input disturbance to the plant 12. The input array 14 transmits one or more input signals to the model 11 as illustrated by line 16. An array 18 of one or more error transducers senses an output or error disturbance from the plant 12. The array 18 of error transducers transmits one or more error signals to the model 11 as illustrated by line 20. The model 11 generates a correction signal that drives an array 22 of one or more output actuators (e.g. transducers) as illustrated by line 24. The array 22 of actuators introduces a cancellation disturbance into the plant 12 to destructively interfere with the input disturbance so that the error disturbance is reduced. The arrays 14, 18 and 22 are generally able to provide spatial preprocessing and postprocessing of the input, error, and correction signals. The arrays 14, 18 and 22 are not limited to single input, single output systems, but can represent multiple input, multiple output systems.

The fully adaptive generalized recursive control model 11 shown in FIG. 1, can implement three recursive adaptive filters simultaneously to provide modeling of the plant 12 between the array 14 of input sensors and the array 22 of output transducers, and also to provide modeling of the SE path, which is normally considered to include the path between the array 22 of output actuators and the array 18 of error sensors plus the path through the array 22 of output actuators. Modeling of the SE path allows proper application of the filtered-X and filtered-U algorithms.

As shown in FIG. 1, the A1 filter 26 and the A2 filter 28 are filter elements in a recursive feedforward configuration. The B1 filter 30 and the B2 filter 32 are filter elements in a recursive feedback configuration. The C1 filter 34 and the C2 filter 36 are filter elements in a recursive C model 38 that models the SE path. The A2, B2 and C2 filters are recursive elements. The model 11 adapts so that the error signal or signals in line 20 are in general reduced.

The error signal or signals in line 20 are transmitted to a convergence element 40 which can choose an optimum convergence factor, and even a separate optimum convergence factor for each of the A and B filter elements 26, 28, 30 and 32. After the convergence element 40, the error signal is transmitted in line 42 to update the adaptive weights in the A1 filter 26; in line 44 to update the adaptive weights in the A2 filter 28; in line 46 to update the adaptive weights in the B2 filter 32; and in line 48 to update the adaptive weights in the B1 filter 30. Due to the presence of transfer functions following the outputs of the A1 filter 26, the A2 filter 28, the B1 filter 30, and the B2 filter 32, adaptive updating is performed according to the filtered-X or more generally, according to the filtered-U algorithms. This requires that the C model be copied into the input regressor for each adaptive element. That is, the input to each filter element 26, 28, 30 and 32 passes through a copy of the C model 38 before being multiplied by the error signal to update the adaptive weights.

With respect to feedforward control, the input signal to the A1 filter 26 is transmitted in line 50 to a C model copy 52. The output from the C model copy 52 in line 54 is multiplied with the error signal in line 42 from the convergence element 40 in a multiplier 56 and the resulting signal in line 58 is used to update the adaptive weights (i.e. adaptive coefficients) in the A1 filter 26. The output from the feedforward model is the sum of the outputs from the A1 filter 26 in line 60 and the output from the A2 filter 28 in line 62 which are summed in summer 64. The output from the feedforward model is transmitted to the output array 22 and also in line 74 as the input to the A2 filter 28. The input to the A2 filter 28 in line 74 is also transmitted to C model copy 76. The output from the C model copy 76 in line 78 is multiplied in multiplier 80 with an error signal 44 from the convergence element 40. The output from the multiplier 80 in line 82 is provided to the A2 filter 28 to update the adaptive weights of the A2 filter 28.

Although the C model 38 can be determined off-line, it is desirable to model the SE path on-line when the control system is operating to reflect all changes in transfer functions. On-line C modeling can be accomplished using an independent random noise source 70 that transmits random noise in line 84 to the C model 38 as input to the C1 filter 34 and a multiplier 86. The error signal enters the C model 38 in line 96 and is subtractively summed in summer 98 with the summation of the outputs from the C1 filter 34 and the C2 filter 36. The outputs of the C1 filter 34 and the C2 filter 36 are summed in summer 100. The output from summer 100 is then input to the recursive C3 filter 36 and also to the multiplier 102. The difference between the error signal and the output from summer 100 is transmitted in line 104 and is multiplied in multipliers 86 and 102 to generate signals in lines 106 and 108 respectively for error updating of the C filters 34 and 36 respectively.

The random noise is also transmitted in line 88 to a summer 90 so that the correction signal in line 24 contains the random noise. The random noise can also be transmitted to summers 72, 92 and 94 to compensate for the random noise in the feedforward and feedback filters.

With respect to the feedback control, online, closed-looped modeling is provided. The B1 filter 30 and the B2 filter 32 are a recursive IIR filter structure in a pure feedback control mode to modify the dynamic response of the system when the *C copy filter 110 is set to zero. When the *C copy 110 is set to zero, the input to the B1 filter 30 and the B2 filter 32 is the error signal in line 112. The error signal in line 112 is also transmitted to a C model copy 119. The output from the C model copy 119 is multiplied with an error signal in line 48 in multiplier 121. The output from multiplier 121 is used to update the adaptive weights in the B1 filter 30. The output of the feedback model is in line 114 and can be summed with the output from the feedforward model in line 72 in summer 116. The output from the feedback model in line 114 is also the input to the recursive B2 filter 32, and to a C model copy 118. The output from the C model copy 118 is multiplied in multiplier 120 with an error signal in line 46. The output from multiplier 120 in line 122 is used to update the adaptive weights in the recursive B2 filter 32. The output from the recursive B2 filter 32 in line 124 is summed with the output from the B1 filter 30 in line 126 and summer 128.

A regenerative feedback model (i.e. an equation error model) can be formed by filtering the output in line 114 through the *C model copy 110, and summing the output from the *C model 110 in line 130 in summer 132 with the error signal in line 112. This results in a reconstruction of the primary disturbance and will maintain an input to the B1 filter 30 having a magnitude even when the error signal vanishes. Such a regenerative system can be particularly useful for attenuating periodic disturbances.

Feedforward modeling is capable of broadband control if the array 14 of input sensors are located far enough away from the array 22 of actuators to provide sufficient time for causality. However, acoustic feedback from actuators to the input sensors can result in instability in some circumstances. Feedback modeling avoids instability, but is generally useful only for controlling band limited signals. Damping system resonances using pure feedback control can provide improved converging characteristics for feedforward control. Also, the effects of system non-linearites can be reduced with feedback control. Since the fully adaptive generalized recursive control model 11 shown in FIG. 1, is a combined feedforward and feedback system, it provides effective, broadband cancellation and also effectively reduces strong spectral components associated with the disturbance, as well as system resonances.

The fully adaptive generalized recursive control model 11 can be converted to a fully adaptive feedforward control model 134 as shown in FIG. 2, or a fully adaptive feedback control model 136 as shown in FIG. 3, by deleting portions of the model 11. Deletion can be done in order to reduce cost and complexity when elements are not necessary for a given application. This enables a common software and hardware package to be applied to a wide variety of applications, and to meet many different operational requirements.

FIG. 2 illustrates a fully adaptive feedforward control model 134 in which the A1 filter 26 could be an FIR filter element adapted using the filtered-X LMS algorithm. The model 134 is readily expanded to an IIR approach using the filtered-U RLMS algorithm by adding the recursive A2 filter 28 from FIG. 1. Alternatively, an IIR approach could be constructed through the addition of the B1 filter 30 as shown in FIG. 2 (B1 filter 30 now acts as a recursive filter). The input to the B1 filter 30 could be the system output from summer 92, which is a standard IIR/RLMS system; or the input to the B1 filter 30 could be formed from the summation of the error signal in line 112 with a form of the system output that is filtered through the *C model copy 110. In addition, the input to the B1 filter 30 could simply be the error signal in line 112. This would result in a hybrid system consisting of the A1 filter 26 for feedforward control and the B1 filter 30 for pure feedback control.

A fully adaptive feedback recursive control model 136 is shown in FIG. 3, in which the adaptive B1 filter 30 and the adaptive B2 filter 32 are used. A regenerative feedback approach can be formed by filtering the model output from summer 92 through *C model copy 110 and summing the output from *C model copy 110 with an error signal in line 112 in summer 132.

Hardware Configuration

The fully adaptive recursive control models 11, 134, and 136 shown in FIGS. 1–3, can be implemented in the system 10 shown in FIGS. 4–14 during the development of an active sound or vibration control system.

Figure 4:
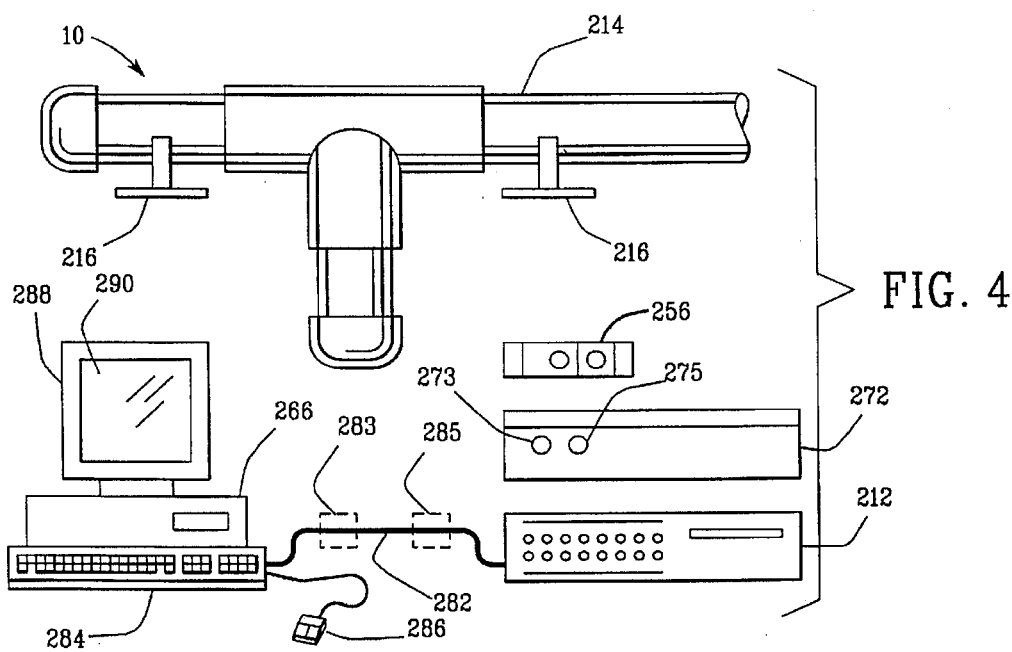
FIG. 4 is a schematic drawing showing the hardware components of the invention with a test duct assembly.

FIG. 4 shows an electronic controller 212 that processes information to control sound in a test duct assembly 214. The test duct assembly 214 is supported on one or more stands 216. Referring to FIG. 6, the test duct assembly 214 has a duct 217 preferably made of PVC pipe components. The duct 217 has a main portion 218 through which sound propagates. The main portion 218 has an input end 220 and an output end 222. The duct 217 also has a branch portion 224 through which a canceling sound wave is introduced into the main portion 218 of the duct 217. To ease installation, and improve flexibility of use, the duct 217 can be made using straight pieces of pipe in about 3' lengths such as pipe pieces 226, 227 and 228. The pipe pieces 226, 227 and 228 can be connected together with straight couplings 230. Additional pipe pieces can be added to make the duct 217 longer. In addition, one or more elbows can be used in place of straight couplings 230 to fold the duct 217.

The branch 224 portion is attached to the main portion 218 of the duct 217 using a pipe tee 232. A cancellation speaker 234 (i.e. an actuator) is located in the branch portion 224. An end cap 236 is used to cover the opening in the branch portion 224 behind the cancellation speaker 234.

A reference speaker 238 is located in the input end 220 of the main portion 218. The reference speaker 238 is a noise source to provide an input sound that propagates down the main portion 218 of the duct 217. A reference speaker 238 is the preferred noise source, but any noise source (such as a fan) can be used. An end cap 240 covers the opening behind the reference speaker 218 in input end 220 of the main portion 218. The speakers 234 and 238 are preferably 8 ohm or 4 ohm speakers.

The main portion 218 of the duct 217 contains access holes 242, 243, 244, 245 through the wall of the duct 217 for microphones. Typically, a user would place a reference (or input) microphone 248 in the duct 217 through access holes 242, 243 or 244 and an error (or feedback) microphone 250 in the duct 217 through access hole 245. Batting material 246 can be installed around the inside diameter of the duct 217.

For the purposes herein, the test duct assembly 214 is described as having a single reference microphone 248 positioned through access hole 242, and a single error microphone 250 positioned through access hole 245. The test duct assembly 14, however, can have more than one reference microphone 248 or more than one error microphone 250.

Referring to FIG. 5, the reference microphone 248 provides an electrical signal that is transmitted to a reference microphone power module 252 for a first stage of amplification. Likewise, an electrical signal from the error microphone 250 is transmitted to an error microphone power module 254 for first stage amplification. It is preferred that the microphone power modules 252 and 254, be placed in close proximity to the microphones 248 and 250, respectively. This is because the microphone power modules amplify the microphone signals to improve the accuracy of transmitted signals. The amplified reference signal from the reference microphone power module 252 is transmitted to a microphone preamplifier 256 through line 258. Likewise, the amplified error signal from the error microphone power module 254 transmits an amplified error signal to the microphone preamplifier 256 through line 260. The microphone preamplifier 256 further amplifies the reference and error signals. The microphone preamplifier 256 is preferably an operator adjustable multi-channel device providing a source of linear and undistorted amplification. A separate channel is used for each signal being amplified. After amplifying the reference and error signals, the microphone preamplifier 256 transmits the signals to the electronic controller 212 for processing. The amplified reference signal is transmitted from the microphone preamplifier 256 to the electronic controller through line 262. The amplified error signal is transmitted from the microphone preamplifier 256 to the electronic controller 212 through line 264.

The electronic controller 212 has a digital signal processor, an analog/digital interface having input and output terminals, and an RS-232 digital interface used to communicate with a host computer 266. The preferred digital signal processor is a TMS 320C30, which is commercially available from Texas instruments. The preferred digital signal processor can operate two separate control systems contemporaneously because two separate executable codes can be run on the processor contemporaneously.

The analog/digital interface shown in FIG. 5 has eight input terminals 268 and eight output terminals 270. The input terminals 268 receive amplified analog signals from the microphone preamplifier 256. The outputs terminals 270 transmit analog signals to a power amplifier 272. The power amplifier 372 is a user adjustable, dual-channel amplifier that can provide a source of linear and undistorted amplification. The user can separately adjust the amplification of each channel using knobs 273 and 275 on the power amplifier 272 (see FIG. 4).

The electronic controller 212 generates the reference signal and the correction signal in accordance with executable code loaded on the electronic controller 212. The reference signal is transmitted from an butput terminal 270 of the electronic controller 212 to the power amplifier 272 through line 274. An amplified reference signal is transmitted from an output of the power amplifier 272 to the reference speaker 238 through line 280. The cancellation signal is transmitted from another output terminal 268 of the electronic controller 212 to the power amplifier 272 through line 276.. An amplified correction signal is transmitted from an output of the power amplifier 272 to the cancellation speaker 234 through line 278.

The executable code is loaded onto the electronic controller 212 from the host computer 266 over the RS-232 communications link 282. After the executable code has been downloaded from the host computer 266 to the electronic controller 212, the electronic controller 212 operates in accordance with the executable code to, for example, process the amplified microphone signals from lines 264 and 262, and generate the cancellation signal in line 276 (amplified in line 278), to drive the cancellation speaker 234 and attenuate sound propagating through the duct 217.

The host computer 266 continues to communicate with the electronic controller 212 over the RS-232 communication link 282 when the electronic controller 212 is operating. A host computer modem 283 (shown in phantom in FIG. 4), and an electronic controller modem 285 (shown in phantom in FIG. 4) can be used to facilitate communication over a telephone communication link 282 when the electronic controller 212 is in a location remote from the host computer 266.

The preferred host computer 266 is a Compaq Prolinea 4/50 configured with a 486DX2/50 processor, a hard drive mass storage device, at least 8 megabytes of RAM, a keyboard 284, a mouse 286 and a monitor 288 with a color screen display 290. The color screen display 290, the mouse 286, and the keyboard 284 are the hardware components of the user interface. Since communication between the host computer 266 and electronic controller 212 remains open after the executable code has been downloaded, a user can monitor data on the electronic controller 212 in real-time by viewing such data on the screen 290. A user can also send commands in real-time to control the operation of electronic controller 212 using the mouse 286 or the keyboard 284.

Figure 7:
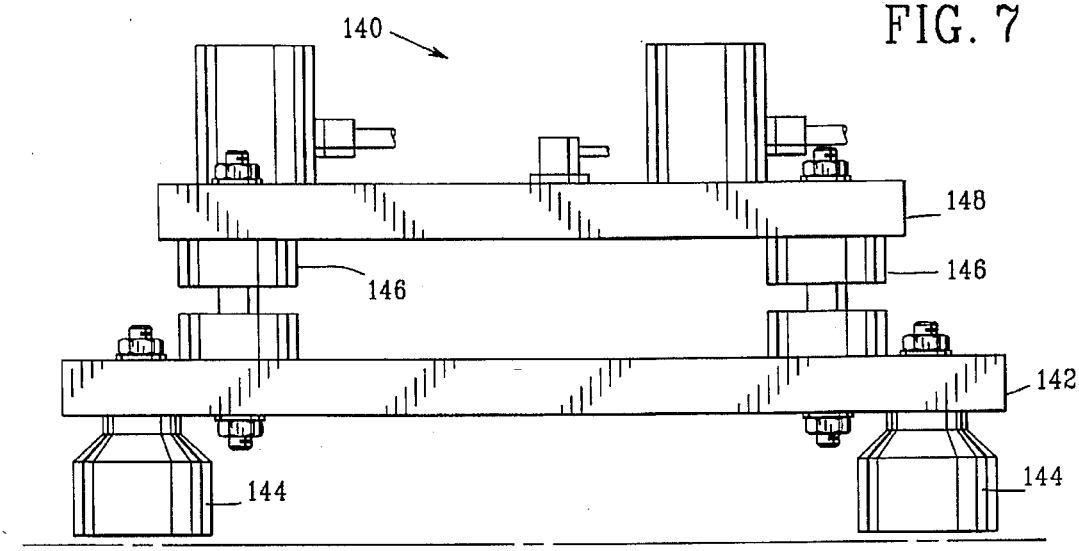
FIG. 7 is a side elevational view of a test vibration stand in accordance with the invention.
Figure 8:
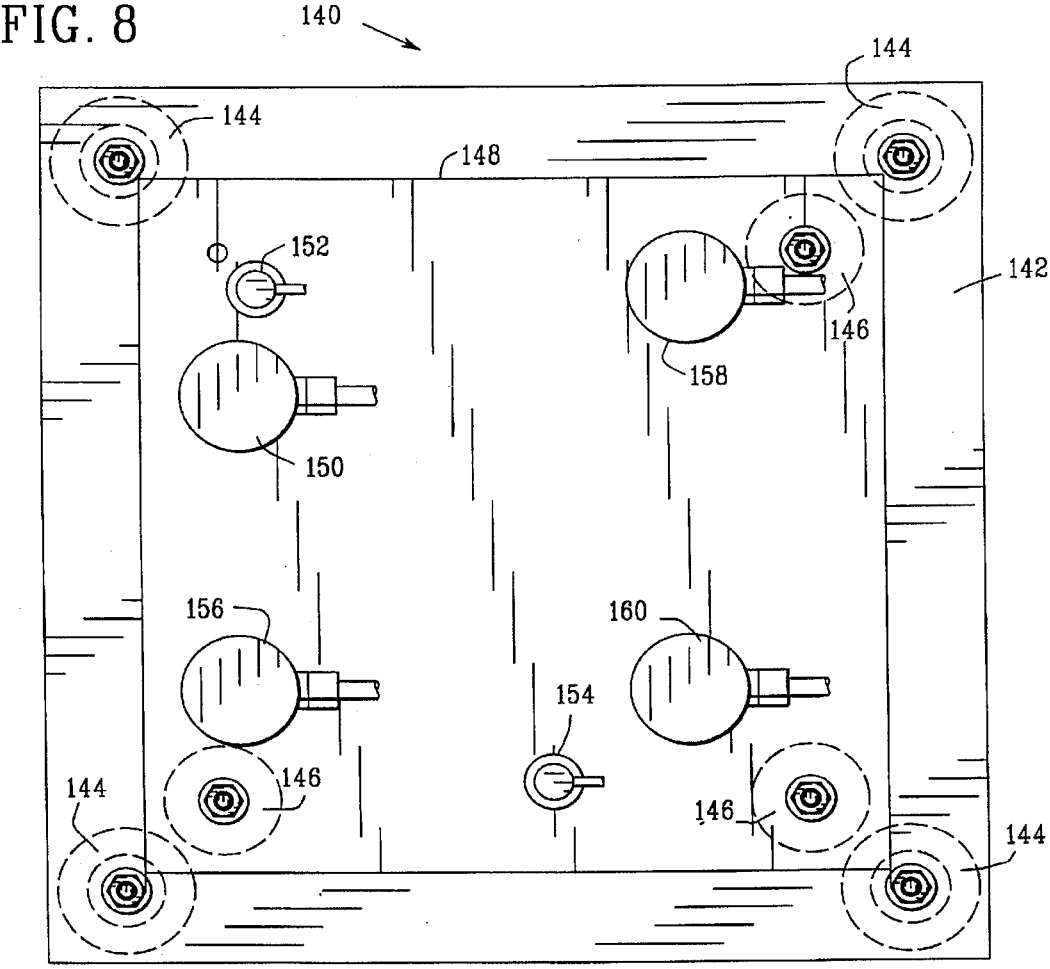
FIG. 8 is a top view of the vibration stand shown in FIG. 7.

FIGS. 7 and 8 show a vibration assembly 140 that can be used in place of the test duct assembly 214 shown in FIGS. 4–6, so a user can learn and develop a vibration control system in contrast to a sound control system. The vibration assembly 140 has a rigid base plate 142 that is mounted on four base mounts 144. The rigid base plate 142 is preferably rectangular, and a base mount 144 is attached near each corner of the base plate 142. Three vibration plate mounts 146 are attached to the top of the base plate 142. The vibration plate mounts 146 support a vibration plate 138 mounted on top of the vibration plate mounts 146. The vibration plate mounts are typically not rigid, so that the vibration plate 148 can move with respect to the base plate 142. A shaking or reference actuator 150 is mounted on top of the vibration plate 148. The reference actuator 150 is preferably an electromechanical shaker that applies a variable force to the vibration plate 148 and causes the vibration plate 148 to move. The reference actuator 150 receives a signal from the electronic controller 212 in much the same manner as the reference speaker 238 in FIG. 6.

Two transducers 152 and 154, preferably accelerometers, are also attached to the top of the vibration plate 148. The accelerometers 152 and 154 are preferably attached to the vibration plate 148 with beeswax, so that they can be moved easily. The transducers 152 and 154 are analogous to the microphones 248 and 250 in FIG. 5 respectfully. However, it is unlikely that the system shown in FIG. 8 is a causal system.

Three canceling actuators 156, 158 and 160 are also attached to the top of a vibration plate 148. The canceling actuators 156, 158 and 160 are preferably electromechanical shakers like shaker 150. The canceling actuators 156, 158 and 160 operate in response to a correction signal from the output terminal 270 of the electronic controller 212 to control movement of the vibration plate 148.

Software Configuration

Figure 9:
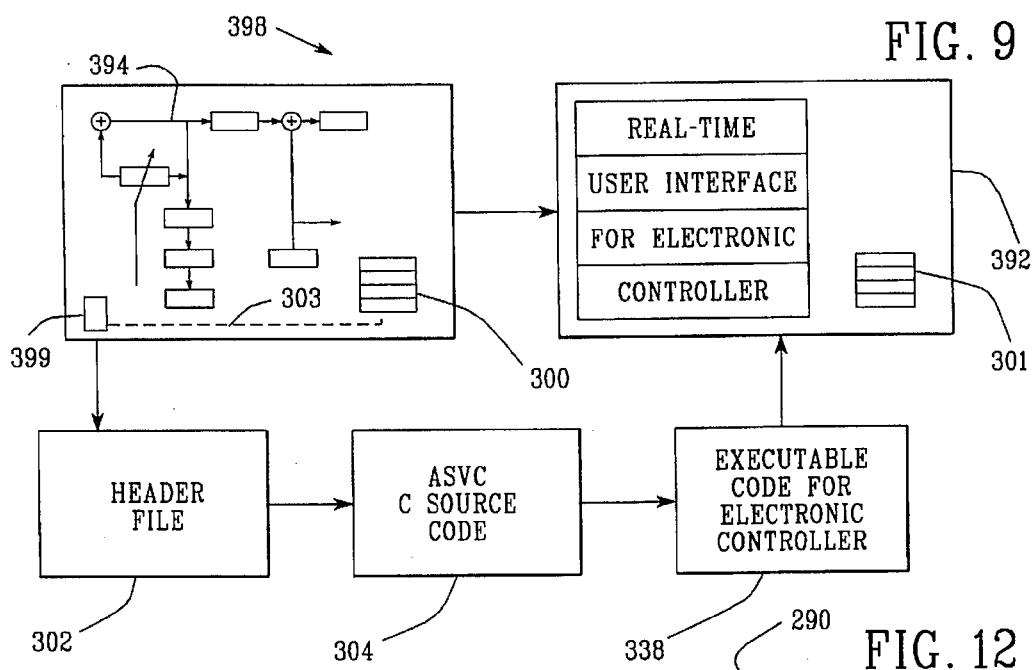
FIG. 9 is a block diagram showing a process for contemporaneously developing customized executable code for an electronic controller and a customized real-time user interface for the electronic controller in accordance with the preferred embodiment of the invention.

The host computer 266 is programmed with software as described in FIGS. 9–14 to facilitate the development and operation of an active sound or vibration control system. FIG. 9 is a block diagram showing contemporaneously developing customized executable code 338 for the electronic controller 212, and a customized real-time interface 392 to the electronic controller 212.

The real-time, user interface 392 to the electronic controller 212 is preferably an operation system 538 (see FIG.

Figure 15A:
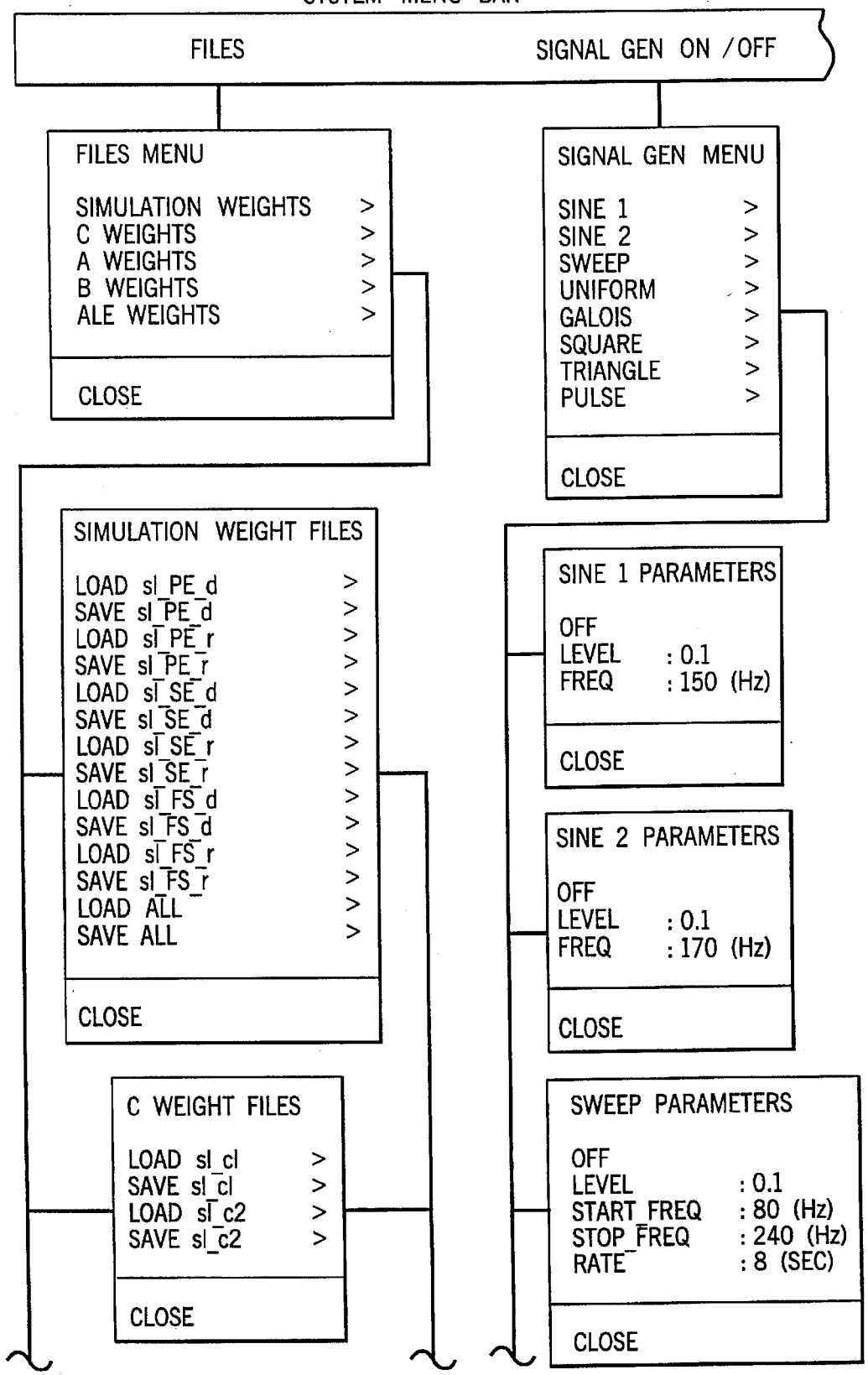
FIGS. 15a–15b are diagrams showing an example of a customized or tailored real-time, monitoring and control menu.
Figure 15B:
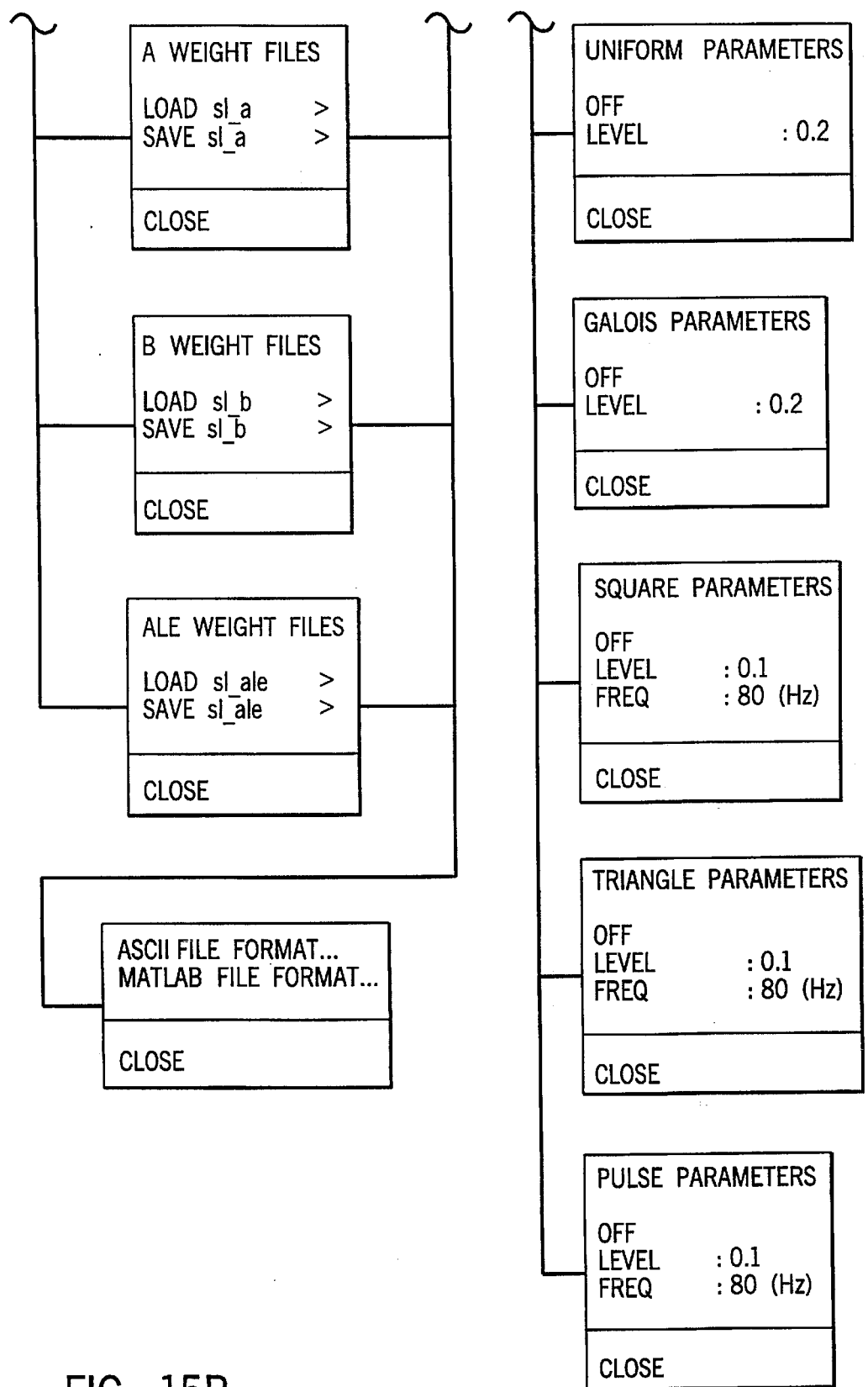
Figure 15C:
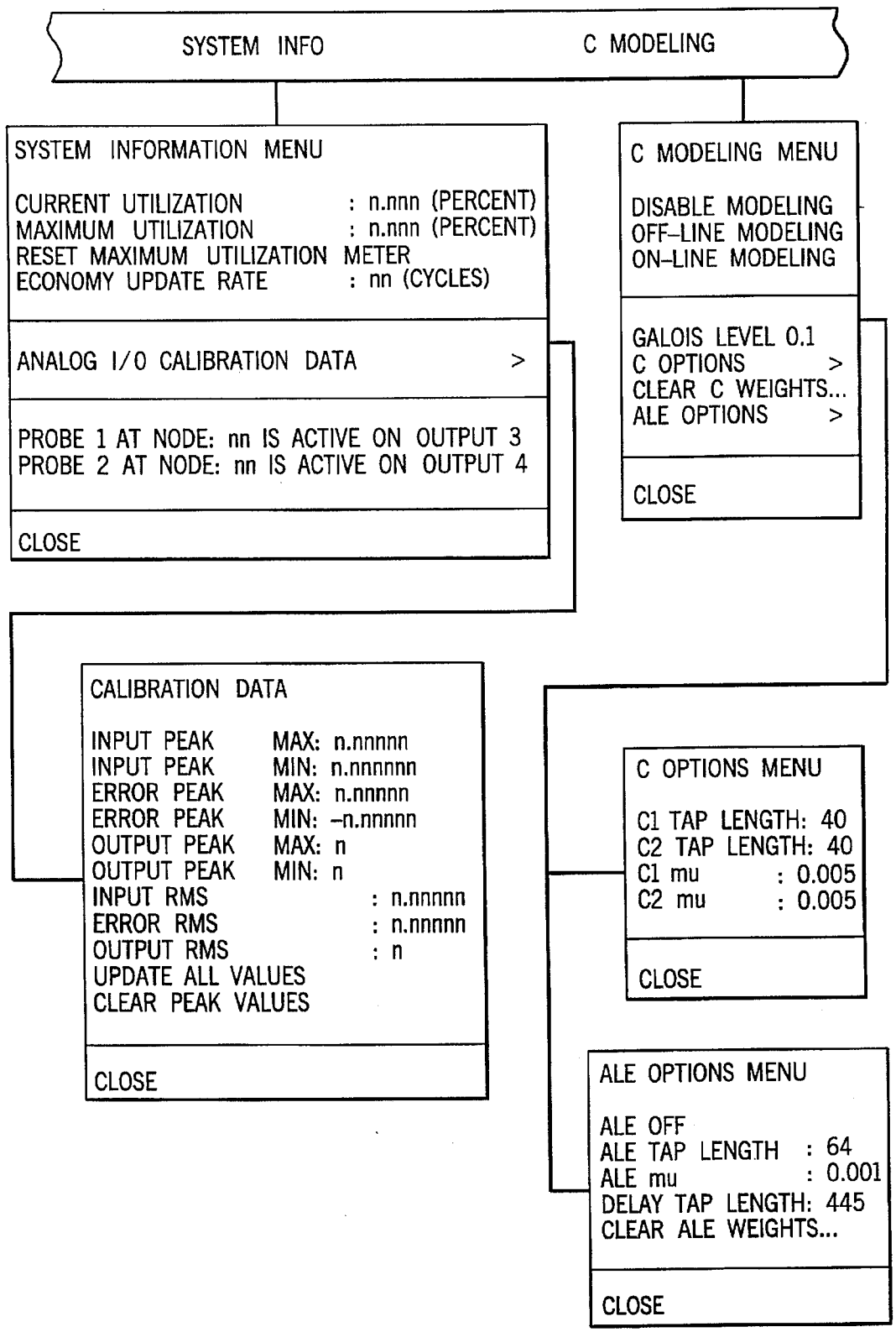
Figure 15D:
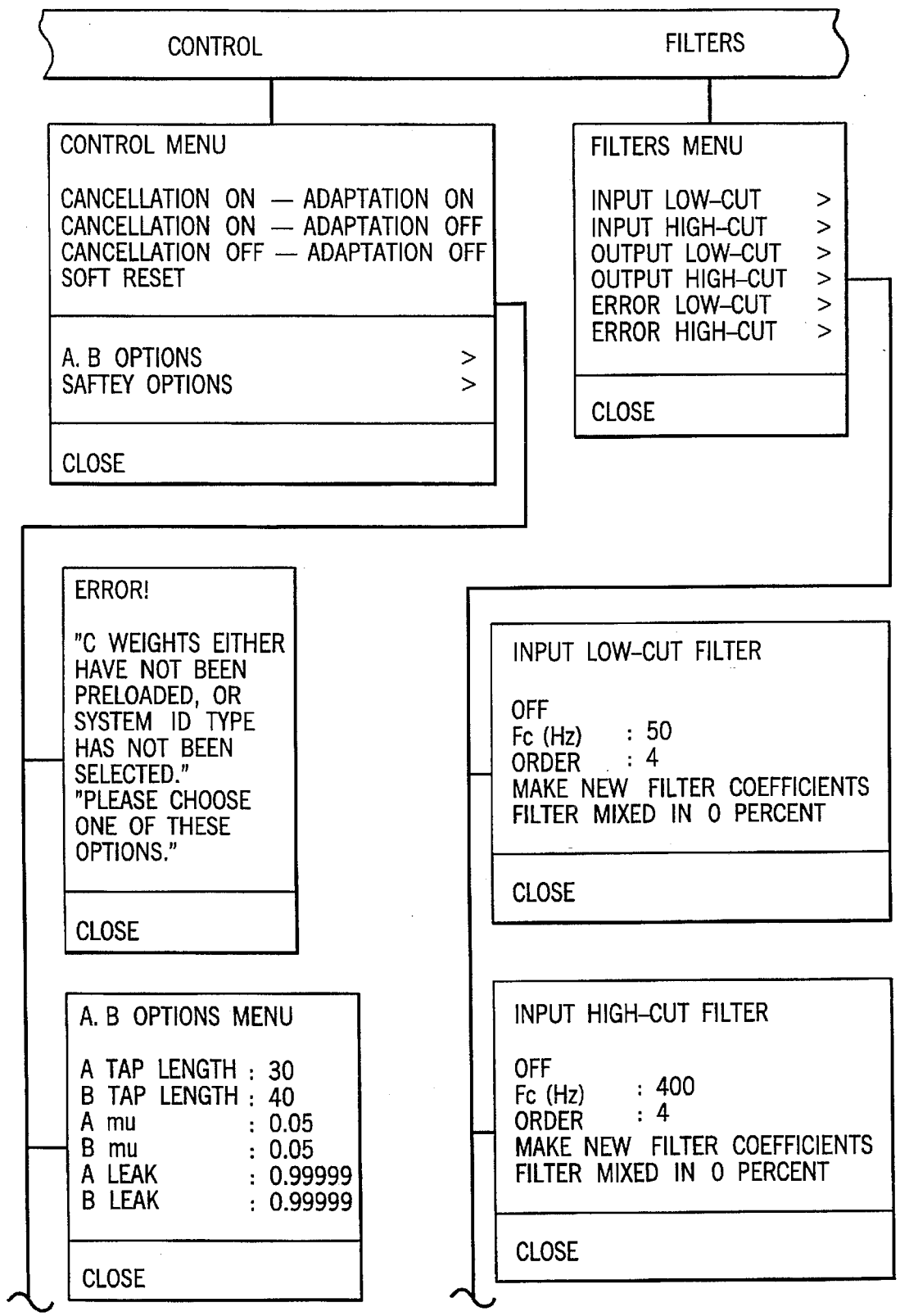
Figure 15E:
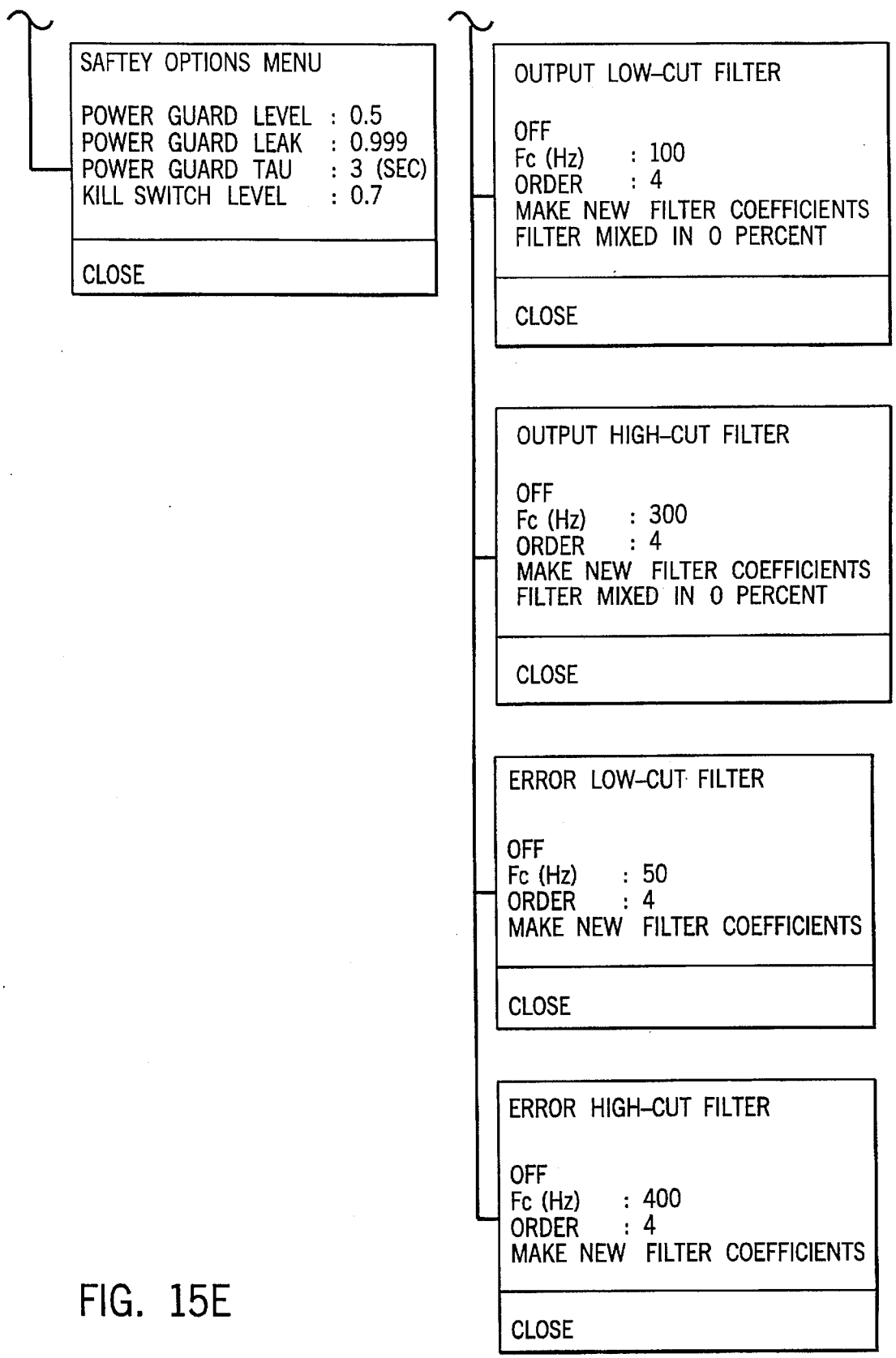
Figure 15F:
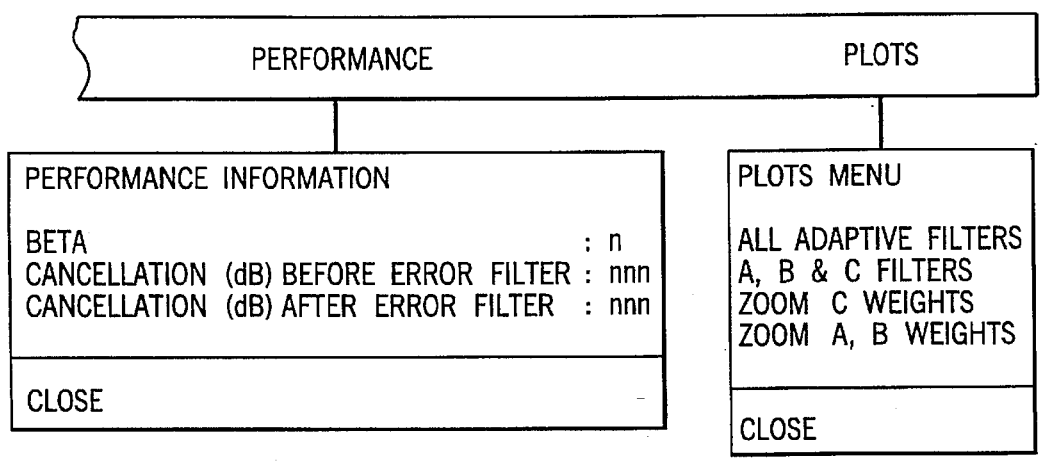

14) for the electronic controller 212 written in the C programming language that runs on the host computer 266. The operation system 538 accepts commands from the keyboard 284 and the mouse 286 on the host computer 266. The operation system 538 also allows for the development of menus (schematically shown in FIG. 9 as menu 301) as an alternative means for invoking commands. A customized real-time, monitoring and control menu shown in FIGS. 15a–15b is an example of a menu 301 designed to invoke particularized commands in the operation system 538. The real-time, monitoring and control menu 301 shown in FIGS. 15a–15b corresponds to a feedforward recursive control model diagram 394 shown in FIG. 10. The customized menu 301 for the real-time interface 392 to the electronic controller 212 is displayed on the screen display 290 of the host computer 266. The real-time interface 392 receives user commands in response to selections from the menu 301 shown in FIGS. 15a–15b. Note that a triangle after a selection on the main menu in FIGS. 15a–15b indicates that there is an associated sub-menu with that selection.

The electronic controller 212 can be monitored and controlled in real-time from the host computer 266 using the selections in menu. For instance, data on the electronic controller 212 can be plotted on the screen 290 of the host computer 266 using commands under the "plots" selection in menu. As another example, parameters for signal generators can be set in real-time under the selection "signal gen on/off".

In order to facilitate development of active sound and vibration control systems and improve user education, the preferred operation system 538 should be able to display data from the electronic controller 212 on the screen 290 of the host computer 266 either graphically or numerically through user configurable plots or displays. The operation system 538 should also be able to read from and write to memory locations on the electronic controller 212 while the controller 212 is operating. The operation system should be able to download the executable code 338 to the electronic controller 212; and, start and stop execution of the executable code 338 on the electronic controller 212.

It is particularly useful that the operation system 538 accept commands from script or batch files 396 (shown in FIG. 14) that contain commands for the operation system and procedure flow commands such as logic operators and the like. For example, the script file 396 could contain commands to first download the executable code 338 from the host computer 266 to the electronic controller 212; and, then create a menu such as the real-time monitoring and control menu 301 to provide an user-friendly real-time user interface 392 to the electronic controller 212.

Referring again to FIG. 9, the executable code 338 that is downloaded to the electronic controller 212 can be modified on the host computer 266 before the code 338 is downloaded. Such modification can be done to improve performance of the system 10, or to merely experiment. One way to modify the executable code 338 is to create or modify source code in a text editor, and compile/assemble the source code to generate object code. Then, linking the object code with other object code from a software collection on the host computer 266. At the same time, the script file 396 can be modified in accordance with the modifications to the source code so that the real-time user interface 392 to the electronic controller 212 corresponds to the executable code 338 operating on the electronic controller 212. This process can be repeated to further optimize the performance of the system 10, or to experiment, but it is time consuming and difficult for one not extraordinarily skilled.

To improve the process of modifying the executable code 338, the preferred embodiment of the invention has an executable program 200 (see FIG. 14) written in the C programming language that runs on the host computer 266 and provides a graphical user interface 398. The graphical user interface 398 prompts information from a user (preferably in a part menu 300 on the display on the screen 290). It is preferred that the graphical user interface 398 provide a control model diagram 394 that can be displayed on the screen 290 of the host computer 266. The control model diagram 394 is a representation of a fully adaptive recursive control model like models 11, 134 or 136 shown in FIGS. 1–3, or a customized model. The diagram 394 should correspond to a software collection 304 containing active sound and vibration control C source code that can implement the control model represented by the diagram 394 which is preferably an adaptive recursive control model like 11, 134 or 136. The control model diagram 394 is comprised of separate parts such as filters, signal generators, adders, multipliers, or any other type of model part that a user wishes to generate.

Each part on the control model diagram 394 can have an associated part menu 300. Users enter information through the part menus 300 to generate the executable code 338. It is preferred that a part having an associated part menu 300 be displayed on the screen 298 in a different color than parts not having a part menu 300. It is also preferred that the part menu 300 for a part be accessible by moving a cursor on the screen 298 to the part and clicking the mouse 286.

Figure 10:
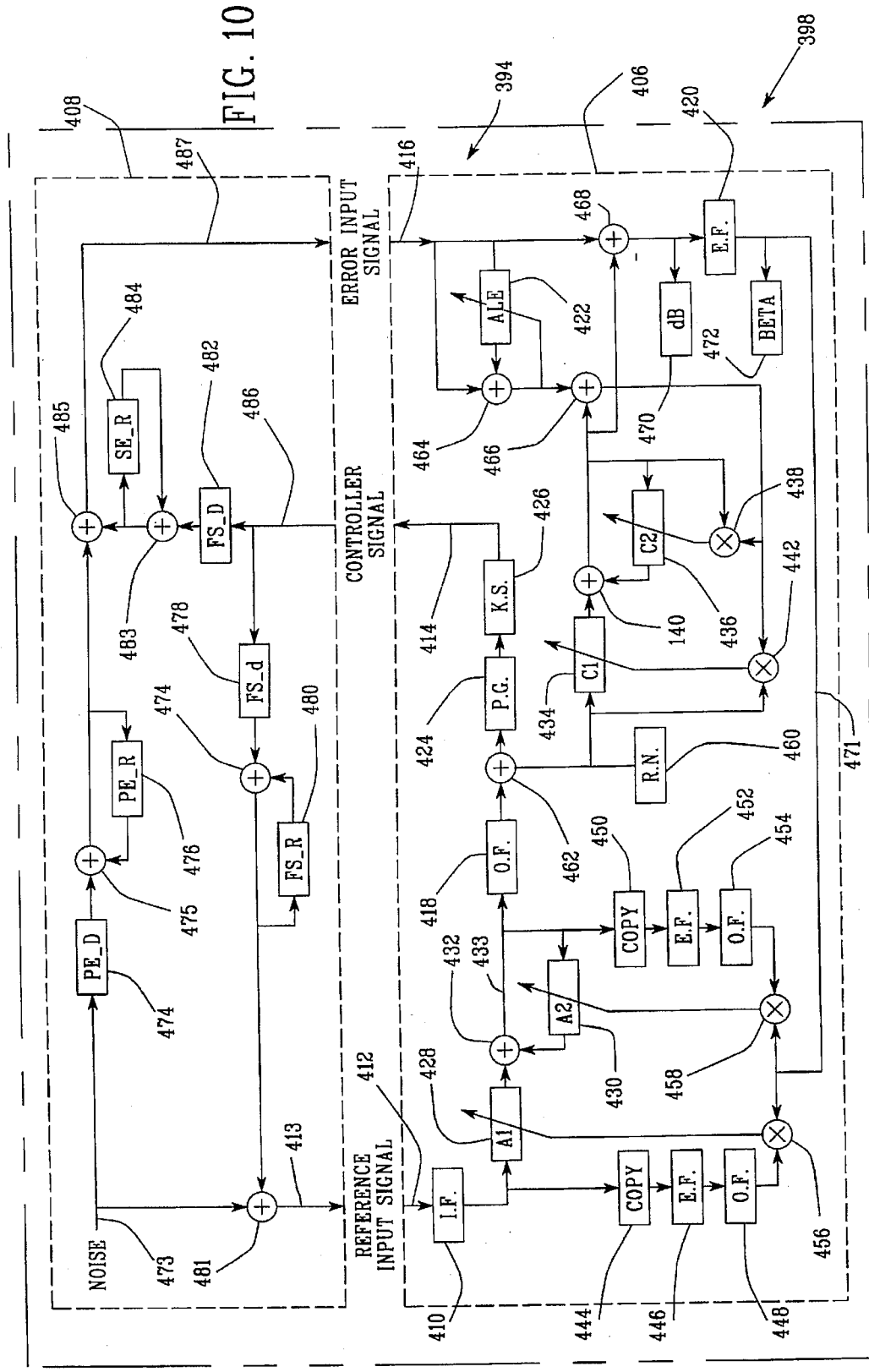
FIG. 10 is a schematic drawing of a generalized recursive feedforward control model diagram in accordance with the preferred embodiment of the invention.
Figure 11:
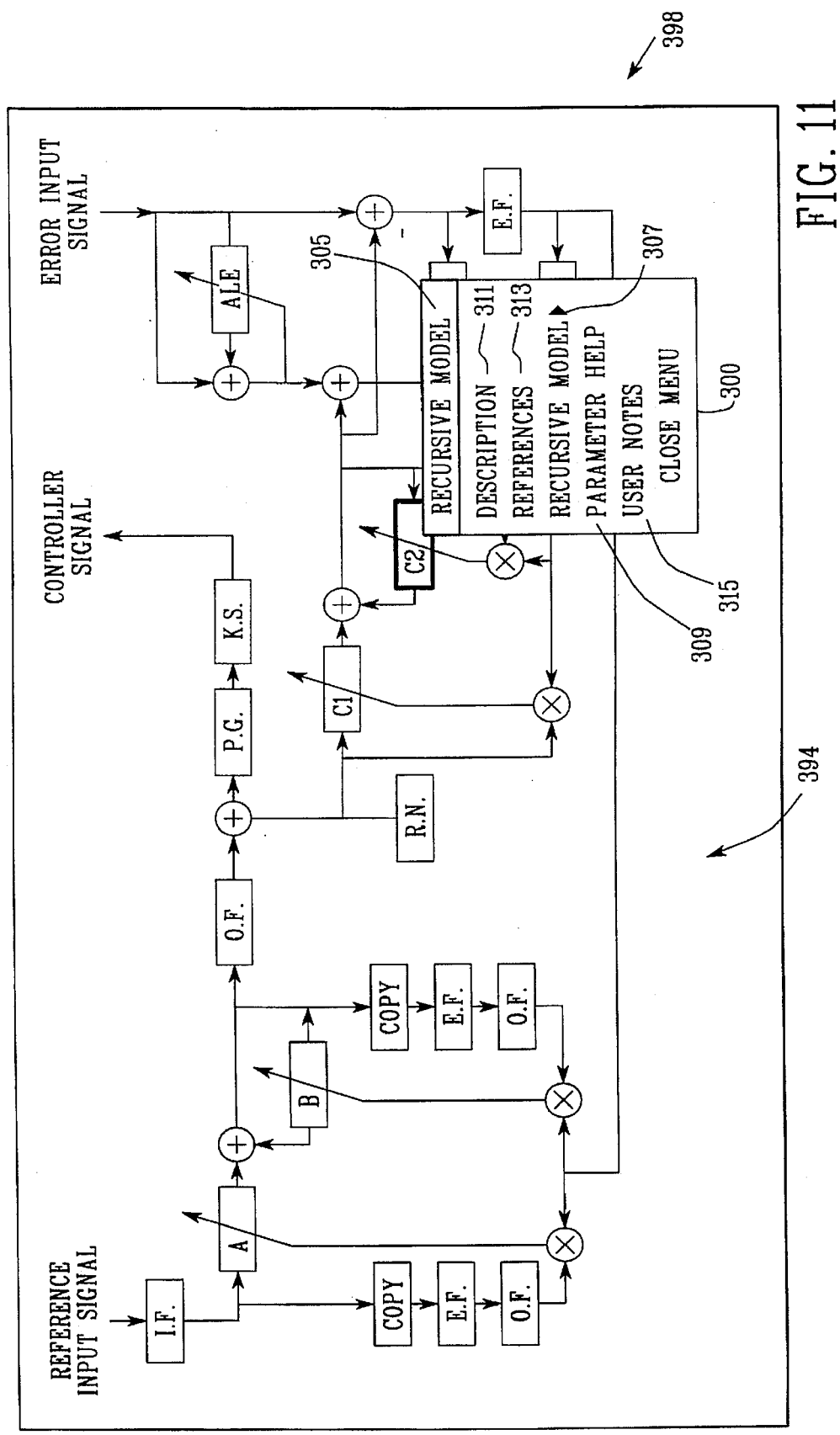
FIG. 11 is a schematic drawing of part of the generalized control model diagram shown in FIG. 10 wherein a part menu is displayed.

FIGS. 10 and 11 show in detail a graphical user interface 398 for developing executable code 338. Referring to FIG. 11, a part menu 300 for the part labeled C2 (in bold) is illustrated to be on the screen 290 of the host computer 266. The part menu 300 is labeled "recursive model" 505 to indicate that the part menu is associated with the recursive element C2. The recursive model part menu 300 has several selections. A triangle 307 next to the "recursive model" selection indicates that there is a sub-menu under the recursive model selection. A user selecting the recursive model selection would view a part sub-menu on the screen 290 in which parameter information for the recursive model part C2 could be entered.

In accordance with the preferred embodiment of the invention, the executable program 200 that operates the graphical user interface 398 also provides a header file generator 399. The header file generator 399 writes information entered through part menus 300 into a C source code header file 302 as indicated by dashed line 303. The information in the header file 302 is used to develop a customized executable code 338 for the electronic controller 212. The collection 304 of ASVE source code is written by the original software supplier or by an experienced user to correspond to the type of information that can be entered by a user through the part menus 300. The generalized source code 304 is preferably written for the C programming language because conventional C compilers contain a preprocessor that can incorporate information from a C source code header file 302. it is preferred that the information entered by the user be incorporated into the header file 302 by creating an ASCII text file with preprocessor statements like #define statements to define parameters. Conventional C compilers can preprocess the #define statements to incorporate the information in the #define statements into the executable code 338 that is eventually downloaded to the electronic controller 212. Preferably, the part menu 300 will facilitate the entry of parameter information by displaying a #define statement on the screen display 290 and allowing the users to enter the information through the mouse 286 or keyboard 284.

Part menus 300 also preferably have other selections. One preferred selection is a "parameter help" selection 309. A user can select "parameter help" 309 to display suggestions on how to set the various parameters for the part. This can help a novice user develop executable code 338. Another preferred part menu 300 selection is a "descriptor" selection 311 which can be selected to give the user a description of the corresponding part. For instance in FIG. 11, selecting descriptor 311 would display a description of the part labeled C2 in the control model diagram 394. Another preferred selection is a "references" selection 313, which provides a list of technical references that the user can read to learn more about the theory of operation of the corresponding part. Another preferred selection is a selection for "user notes" 315 that provides an electronic note pad in which users can create, delete or modify notes regarding the part menu 300, the corresponding part, or anything else the user desires to note. The parameter help 309, descriptor 311, references 313, and user notes 315 selections are primarily teaching devices. The author or authors of the control model diagram 394, the part menu 300, and the associated C language source code 304 can effectively convey helpful information to the novice by including appropriate information under these selections.

Referring to FIG. 10, the preferred system 10 has a control model diagram 394 that includes a block diagram 406 of a fully adaptive recursive control model (i.e. like models 11, 134 or 130), and also a block diagram 408 of a plant simulation model. The control model diagram 406 is preferably displayed on the screen 290 of the host computer 266. Using associated part menus 300, the parts in the control model diagram 406 and in the plant simulation diagram 408 can be enabled or disabled, and information for enabled parts can be entered by the user.

The control model diagram 406 represents the fully adaptive recursive feedforward control model 134 shown in FIG. 2. The control model 406 has a part 410 representing as an input filter that receives a digitized reference or input signal in line 412 from the analog/digital interface of the electronic controller 212. A digitized error input signal is illustrated to enter the model 406 in line 416. The diagram 406 illustrates that a signal from the input filter 410 and the error signal in line 416 will be processed to generate a correction signal in line 414. if the electronic controller 212 is assembled with a duct assembly 214 as shown in FIGS. 4–6, the correction signal in line 414 is transmitted to the cancellation speaker 234.

The control model diagram 406 contains parts which are not specific to the adaptive recursive feedforward control model 134. These parts include: an output filter which is part 418, an error filter which is part 420, an adaptive line enhancer which is part 422, a power guard switch which is part 424, and a kill switch which is part 426. The power guard switch 424 and the kill switch 426 are used to kill the correction signal in line 414 if the signal exceeds certain limits. The control model diagram 406 also includes a part 470 that provides a part menu for checking the decibel level for the error signal in line 416 before the error filter 420; and, a part 472 for checking the error signal after the error filter 420.

The remaining parts in the control model diagram 406 relate to the adaptive recursive feedforward control model 134, and include an A1 filter 428, an A2 filter 430, and summer 432 to generate the correction signal before filtering in the output filter 418. Modeling of the SE path involves a direct C1 filter 434 and a recursive C3 filter 436, a summer 440, two multipliers 438 and 442, and a random noise generator 460. Summer 462 illustrates the addition of random noise to the correction signal. Summers 464, 466, and 468 illustrate the connection between the C model, the adaptive line enhancer 422, and the error signal in line 416. A copy 444 of the C model, a copy 446 of the error filter, and a copy 448 of the output filter are used to filter the input signal before multiplying in multiplier 456 with the error signal in line 421 to update the adaptive weights for the A1 filter 428. A copy 450 of the C model, a copy 452 of the error filter, and a copy 454 of the output filter are used to filter the correction signal in line 433 before multiplying in multiplier 458 with the error signal in line 421 to update the adaptive weights for the recursive A2 filter 430.

A plant simulation diagram 408 is also illustrated in FIG. 10. The plant simulation diagram 408 represents a plant stimulation model that can be incorporated into the executable code 338 that is downloaded to the electronic controller 212. When the plant simulation model is enabled, the processor in the electronic controller 212 operates in accordance with the plant simulation model rather than in accordance with inputs from and outputs to the analog/digital interface. Each of the parts in the plant simulation diagram 408, except for the summers have a part menu 300 associated therewith. In the plant simulation diagram 408, a reference noise is illustrated as input to a simulated plant at point 473. The reference noise at point 473 is a virtual sound. The virtual sound can be a simulation of the same sound that a reference speaker such as reference speaker 238 would produce the test duct assembly 214.

The simulated plant diagram 408 comprises a part 474 representing a direct filter for a main path in the simulated plant between an input to the simulated plant and a canceling actuator in the simulated plant. A part 476 represents a recursive filter for the main path of the simulated plant between the input of the simulated plant and the canceling actuator. Part 475 is a summer representing that the generated executable code 338 will add the output from parts 474 and 476. In a similar fashion, part 478 represents a direct filter for the feedback path between the cancellation actuator and the input of the simulated plant; part 480 is a corresponding recursive filter for the feedback path; and part 479 is an summer adding the outputs from the parts 478 and 480. Summer 181 represents that the executable code will add the outputs from summer 479 to the virtual sound in line 473 to generate a simulated reference input signal in line 413, which is input to the control model diagram 406 at line 412. The correction signal from the control model diagram 406 in line 414 is input into the plant simulation model in line 486. Part 482 represents a direct filter for the SE path in the simulated plant. The SE path in the simulated plant includes a path through the simulated canceling actuator and a path between the canceling actuator and the output of the simulated plant. Part 484 is a recursive filter for the SE path, and summer 483 indicates that the executable code 338 will add the outputs of parts 482 and 484. Summer 485 indicates that the executable code 338 will add the outputs from summer 483 and summer 475 to generate a simulated error signal in line 487, which is input to the control model diagram 406 at line 416.

Figure 12:
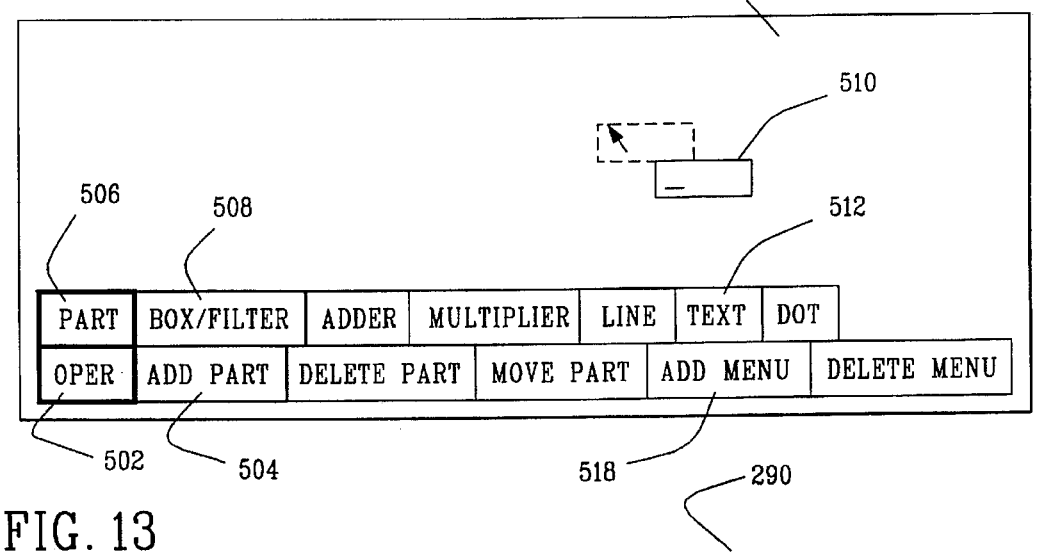
FIG. 12 is a schematic drawing showing a menu and a sub-menu used to graphically edit a control model diagram in accordance with the preferred embodiment of the invention.
Figure 13:
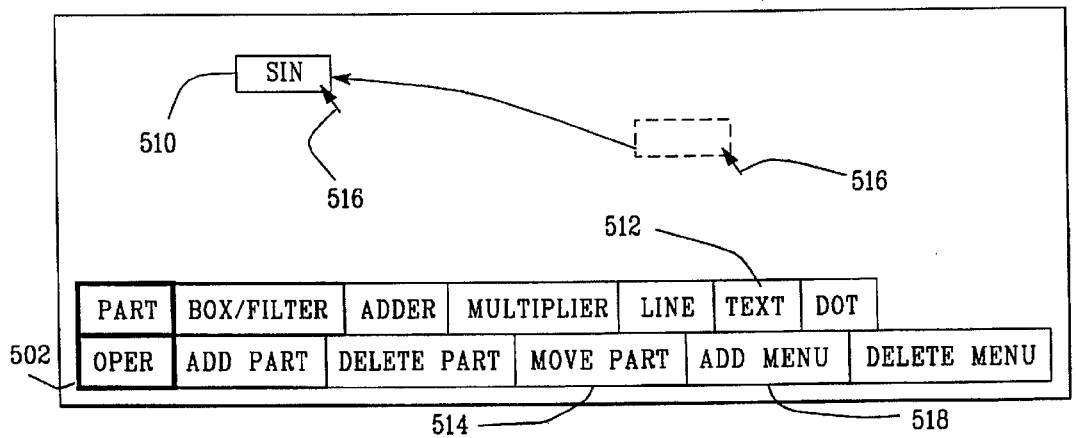
FIG. 13 is a schematic drawing similar to FIG. 12 further showing the moving and labeling of a part in a control model diagram that is being graphically edited.

It may be useful in certain circumstances to modify the control model diagram 406 to illustrate other active sound and vibration control techniques, or to modify the plant simulation diagram 408. Referring to FIGS. 12 and 139, the executable program 200 that provides the graphical user interface 398 and the header file generator 399 can also provide a graphical editor for editing control model diagrams and a menu editor for generating and editing part menus 300. The graphical and menu editors are operated from an operations menu 502 displayed on the screen 290. By choosing the "add a part" selection 504 in the operations menu 502, a part sub-menu 506 appears on the screen 290. By choosing the "box/filter" selection 508 in the part sub-menu 506, a part 510 appears on the screen 290. The part 510 can be labeled by choosing the "text" selection 512 in the part sub-menu 506. FIG. 13 shows that the part 510 can be moved by using the mouse 286 to place a cursor 516 on the part 510 and dragging the part 510 across the screen 290. Other parts such as adders, multipliers, lines and dots can be added, deleted and moved on the screen 290 to create a control system diagram 394.

For each of the parts, such as part 510 on the screen 290, the menu editor can add a part menu 300 using the selection "add menu" 518 on the operations menu 302. The menu editor displays a parts menu 300 associated with the part, allows the user to label the part menu 300, and to enter information under the selections 307, 309, 311 and 315 (see FIG. 11) which have been described above. For instance, the user can enter #define lines under the parameters selection 307 (labeled as "recursive model" in FIG. 11). When a certain parameter is enabled, the #define line will appear on the screen 290 and the user can enter the appropriate value or command. The user can also define under what circumstances the various parts or parameters are enabled or disabled. The header file generator 399 uses an enablement or disablement flag to indicate which #define lines should be incorporated into the header file 302 shown in FIGS. 9 and 14.

Figure 14:
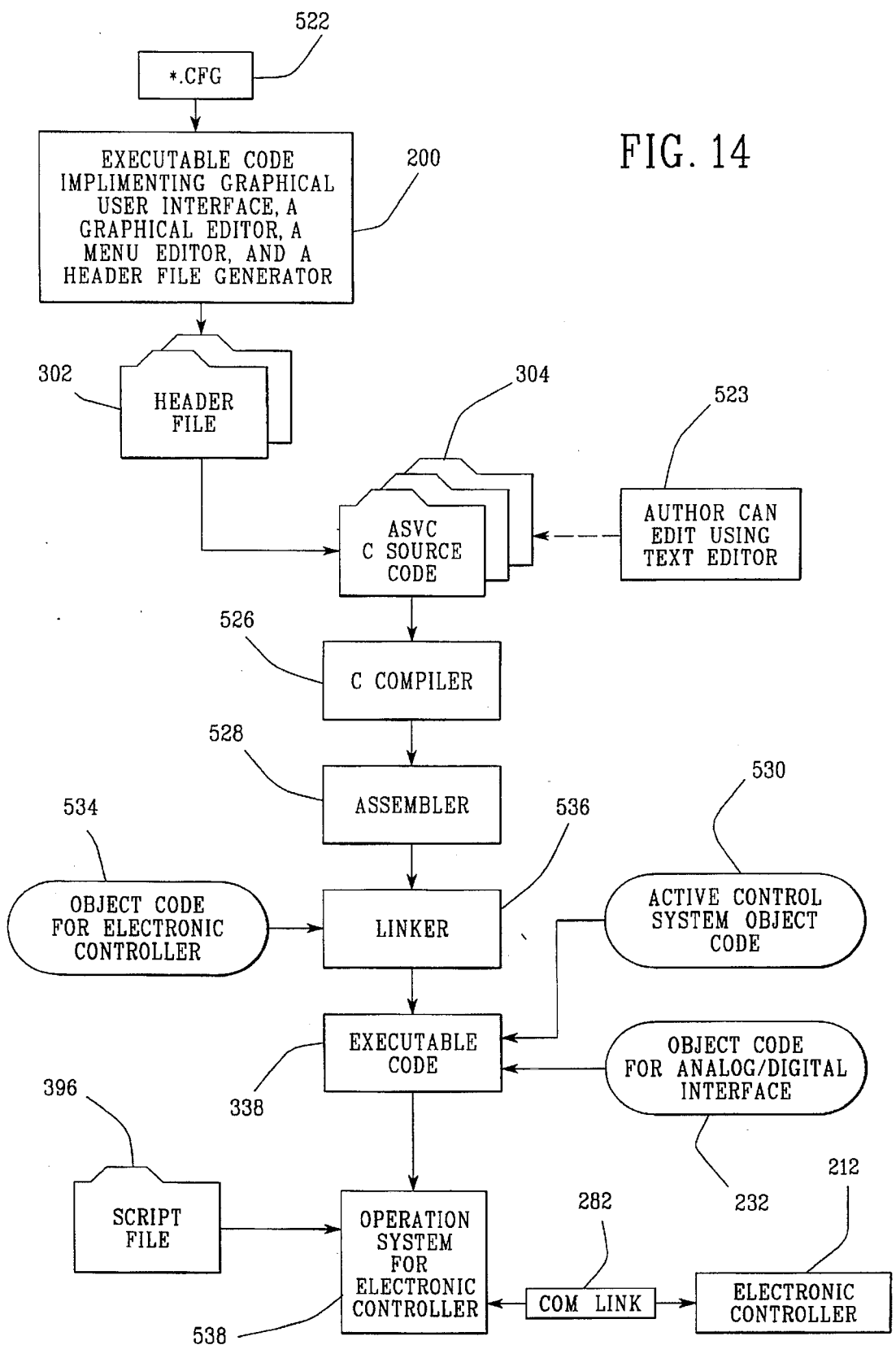
FIG. 14 is a block diagram showing the generation of executable code that is downloaded to the electronic controller.

Referring now to FIG. 14, the author of a control model diagram 394 with associated part menus 300 can create corresponding C code 304 that can preprocess the #define lines of C source code in the header file 302. A skilled C programmer can do this by editing the C source code files 304 in a text editor 523.

FIG. 14 illustrates that to generate an executable code 338, the header file 302 and the C source code files 304 are compiled using a C compiler 526. The C source code files 304 include software relating not only to the control model diagram 406 and plant simulation diagram 408, but also includes a collection of source code including mathematical and electrical processing functions. The C compiler 526 has a built-in preprocessor that analyzes the header file 302 and incorporates the header file 302 before compiling. Commercially available C compilers 526 might not be fully compatible with the electronic controller 212 so it may be desirable to enhance the compiling process to optimize the operation of the electronic controller 212. The C compiler 526 produces assembly code tailored to the particular header file 302. The assembly code is translated into object code by an assembler 528. This object code is linked together with object code from object code libraries 530, 532 and 534 by a linker 536 to produce the executable code 338. Thus, in a general sense, the system has a code generator that generates the executable code 338 from software on the host computer 66 in accordance with user entered information. The executable code 338 is downloaded from the host computer 266 to the electronic controller 212 over the communications link 282. The operation system 538 for the electronic controller 212 manages the down loading and also reads the executable code 338 as it is downloaded. The operation system 538 operates in accordance with the commands in the script file 396, and in accordance with the information in the executable code 338 which allows the real-time user interface 392 to the electronic controller 212 to be customized.

Still referring to FIG. 14, the executable program 200 providing the graphical user interface 398 and the header file generator 399 can save the configuration of the control model diagram 394 and the part menus 300 along with entered parameter information in a configuration file 522. The user can retrieve the configuration file 522 at a later time. The user can also save several different configuration files 522 on the host computer 266.

Operating the system 10 will generally involve displaying a control system diagram 394 on the screen 290, and setting parameters for the various parts shown on the diagram 394 in associated part menus 300. Alternatively, a user can retrieve a configuration file 522 from the host computer 266. The user can trigger a command from the graphical user interface 398 to generate a header file 302 that upon compiling, assembling and linking creates an executable code 338 in accordance with the parameters set in the enabled parts menus 300.

The user can then run the operation system 538 for the electronic controller 212. The executable code 338 can be downloaded onto the electronic controller 212, preferably using the customized real-time user interface 392. The electronic controller 212 then operates on a test plant (such as 214 or 140), a real plant, or a simulated plant. The user can monitor the electronic controller 212 in real-time as displayed on the screen 290 of the host computer 266. Also, the user can send commands in real-time to the electronic controller 212.

The user can modify the executable code 338 by again accessing the graphical user interface 398 to change a parameter in a part menu 300, or alternatively, retrieving a different configuration file 522; and repeating the process of generating and downloading the executable code 338 to the electronic controller 212.

It is recognized that various equivalents, alternatives and modifications are possible and should be considered within the scope of the appended claims. For instance, while the preferred embodiment is as described above, the invention does contemplate a system in which all or part of the software collection implementing the adaptive recursive control model is located in the electronic controller 212, rather than in the host computer 266. Such a system might not require the user to download executable code from the host computer 266 to the electronic controller 212.

We claim:

1. A system for developing and operating an active sound or vibration control system comprising:

a software collection containing generalized control system software to program an electronic controller for use in an active sound or vibration control system, the generalized control system software implementing a generalized adaptive control model for an active sound or vibration control system;

a user interface that prompts a user to enter information pertaining to the generalized adaptive control model to develop a customized adaptive control model;

a code generator that generates customized executable code from the generalized control system software in accordance with the information entered by the user to develop the customized adaptive control model from the generalized adaptive control model; and, a loader that loads the customized executable code to the electronic controller so that the electronic controller can operate an active sound or vibration control system in accordance with the customized adaptive control model.

2. A system as recited in claim 1 wherein the user interface is a part menu displayed on a screen.

3. A system as recited in claim 1 wherein the software collection, the code generator, and the loader reside on a host computer having a screen; and the user interface is a graphical user interface displayed on the screen which displays a control model diagram that identifies parts of the customized adaptive control model being developed.

4. A system as recited in claim 3 wherein at least one of the parts of the control model diagram has an associated part menu which can be displayed on the screen to prompt the user to enter information pertaining to the part.

5. A system as recited in claim 3 further comprising a graphical editor that can display the control model diagram on the screen and can edit the control model diagram by adding parts to deleting parts from and moving parts in the control model diagram while the control model diagram is displayed on the screen.

6. A system as recited in claim 1 further comprising an information storage device in which the information entered by the user can be stored in a configuration file and retrieved for later use.

7. A system as recited in claim 1 wherein the generalized adaptive control model is an adaptive generalized recursive control model.

8. A system as recited in claim 1 wherein the generalized adaptive control model is an adaptive feedforward control model.

9. A system as recited in claim 1 wherein the generalized adaptive control model is an adaptive feedback control model.

10. A system as recited in claim 1 wherein the code generator generates the customized executable code by:
creating a header file of source code corresponding to the information entered by the user to develop the customized adaptive control model from the generalized control model; and
compiling and linking the header file with generalized control system software from the software collection implementing the generalized adaptive control model.

11. A system as recited in claim 10 wherein the software collection contains both source code and object code, and source code in the software collection can be edited to modify the executable code generated from the information entered by the user in the header file.

12. A system as recited in claim 5 wherein the graphical editor has an operation menu having:
a selection for deleting a part;
a selection for moving a part; and
a selection for adding a part, and under the selection for adding a part also has a sub-menu with a separate selection for various parts used to create the control model diagram.

13. A system as recited in claim 11 wherein the sub-menu also has a selection under which a user can label the part so that a part label is displayed on the screen in the control model diagram.

14. A system as recited in claim 2 further comprising a part menu editor for editing the part menu that is displayed on the screen.

15. A system as recited in claim 4 further comprising a part menu editor to create, delete and modify one or more part menus that can be displayed on the screen.

16. A system as recited in claim 4 wherein a part menu has a selection that lists parameters for the corresponding part that can be set to modify the customized executable code, and the system further comprises:
means for entering information through the user interface to set the listed parameters.

17. A system as recited in claim 16 wherein the part menu further has a selection that expresses suggestions for setting the listed parameters.

18. A system as recited in claim 4 wherein the part menu has:
a selection that expresses a description of the associated part; and
a selection listing technical references pertaining to the associated part.

19. A system as recited in claim 4 wherein the part menu has a selection that provides an electronic note pad in which a user can create, delete, or modify notes.

20. A system as recited in claim 1 wherein the software collection also contains plant simulation software for programming the electronic controller to simulate operation of the electronic controller in an active sound or vibration control system.

21. A system as recited in claim 3 wherein the control model diagram includes a plant simulation diagram for developing executable code that can be loaded onto the electronic controller to simulate the operation of the electronic controller in accordance with the plant simulation diagram.

22. A system as recited in claim 21 wherein the plant simulation diagram comprises:
a main plant part representing a main path between an input to a plant being simulated and an actuator introducing a canceling input into the plant being simulated;
a feedback part representing a feedback path between the actuator and the input in the plant being simulated; and,
a signal/error part representing a signal/error path in the plant being simulated which includes a path through the actuator and a path between the actuator and the output of the plant being simulated.

23. A system as recited in claim 1 wherein the generalized control system software that implements the generalized adaptive control model includes software for implementing a filtered-U control model.

24. A system for developing and operating an active sound or vibration control system comprising:
a host computer having a software collection containing generalized control system software that implements a generalized adaptive control model to program an electronic controller for use in an active sound or vibration control system, a communications port, a user interface that prompts a user to enter information pertaining to the generalized adaptive control model to develop a customized adaptive control model for a plant being controlled, and means for generating customized executable code in accordance with the information entered by the user to develop the customized adaptive control model from the generalized adaptive control model;
an electronic controller having a communications port, and having an input terminal for receiving a signal from a sensor monitoring the plant being controlled, and an output terminal for transmitting a correction signal to an actuator for controlling an output of the plant; and
a communications link between the communications port of the host computer and the communications port of the electronic controller through which the customized executable code can be downloaded from the host computer to the electronic controller so that the electronic controller can operate in accordance with the customized adaptive control model.

25. A system as recited in claim 24 wherein the user interface on the host computer comprises a screen that can graphically display a control model diagram that identifies parts of the customized adaptive control model being developed.

26. A system as recited in claim 24 wherein:
the host computer operates an operation system for monitoring and controlling the electronic controller, and communicates with the electronic controller via the operation system and the communications link to monitor and control the operation of the electronic controller in real-time; and
the host computer further has a script file of operation system commands for setting up a real-time user interface, and the operation system customizes the real-time user interface in accordance with the customized executable code.

27. A system as recited in claim 24 further comprising:
a host Computer modem for modulating and demodulating communications between the communications port of the host computer and the communications link; and
an electronic controller modem for modulating and de-modulating communications between the communications port of the electronic controller and the communications link.

28. A system as recited in claim 24 further comprising:
a test plant for an active sound control system, wherein the electronic controller can be operated in accordance with the customized executable code in a controlled environment.

29. A system as recited in claim 24 further comprising:
a test plant for an active vibration control system, wherein the electronic controller can be operated in accordance with the customized executable code in a controlled environment.

30. A system as recited in claim 24 further comprising a duct assembly including:
a duct having a main portion with an input end and an output end, and a branch portion that branches off the main portion between the input end and the output end, the main portion of the duct having a microphone access hole after the branch;
a noise source loudspeaker located in the input end of the duct that creates a noise that propagates down the duct;
an error microphone positioned in the access hole in the duct located after the branch, the error microphone generating a signal that is transmitted to the input terminal of the electronic controller; and,
a canceling loudspeaker located in the branch of the duct, the canceling loudspeaker operating in response to a correction signal from the output terminal of the electronic controller to control the noise in the duct created by the noise source.

31. A system as recited in claim 30 wherein the main portion of the duct has another microphone access hole before the branch, and the system further comprises a reference microphone positioned in the access hole of the duct located before the branch, the reference microphone generating a signal that is transmitted to another input terminal of the electronic controller.

32. A system as recited in claim 24 further comprising a vibration assembly including:
a rigid base plate;
base mounts attached to the bottom of the base plate;
vibration plate mounts attached to the top of the base plate;
a vibration plate mounted on the vibration plate mounts;
shaking actuator that applies a variable force to the vibration plate;
a transducer attached to the vibration plate for sensing movement of the vibration plate, the transducer generating a signal that is transmitted to the input terminal of the electronic controller; and
a canceling actuator attached to the vibration plate, the canceling actuator operating in response to a correction signal from the output terminal of the electronic control to control movement of the vibration plate.

33. A system for developing and operating an active sound or vibration control system comprising:
an electronic controller for an active sound or vibration system;
a software collection containing generalized control system software to program the electronic controller, the generalized control system software implementing a generalized adaptive control model for an active sound or vibration control system; and
a user interface that prompts the user to enter information pertaining to the generalized adaptive control model to develop a customized adaptive control model;
wherein the electronic controller operates in accordance with the information entered by the user to develop the customized adaptive control model from the generalized adaptive control model.

34. A method for developing and operating an active sound or vibration control system comprising the steps of:
displaying a control model diagram on a screen, the control model diagram representing a generalized adaptive control model and being comprised of parts that represent aspects of the generalized adaptive control model;
modifying the control model diagram by adding, deleting, or moving parts of the control model diagram on the screen to create a tailored control model diagram on the screen; prompting a user to enter information through a user interface, the information pertaining to one or more parts in the tailored control model diagram to develop a customized adaptive control model;
generating customized executable code in accordance with the information entered by the user to develop the customized adaptive control model from the tailored control model diagram;
operating the electronic controller in accordance with the customized executable code to control an output from a physical sound or vibration plant by controlling an actuator that provides a cancellation input to the plant.

35. A method as recited in claim 34 wherein the customized executable code is generated by creating a header file in source code containing the information entered by a user through the user interface, and compiling and linking the header file with control system software from a collection of generalized control system software that implements the generalized adaptive control model.

36. A method as recited in claim 34 further comprising the step of loading the customized executable code onto the electronic controller before operating the electronic controller in accordance with the customized executable code.

37. A method as recited in claim 34 further comprising the steps of:
monitoring the plant for data with sensors that provide signals to the electronic controller;
communicating with the electronic controller while the electronic controller is operating;

displaying on the screen in real-time data that has been provided to the operating electronic controller.

38. A method as recited in claim 34 further comprising the steps of:

communicating with the electronic controller over a communications link; and controlling the electronic controller in real-time by transmitting control signals to the electronic controller over the communications link.

39. A method as recited in 34 further comprising the steps of:

monitoring the operation of the electronic controller when the electronic controller is operating in accordance with the customized executable code on a plant receiving a reference input; and modifying the user information entered through the user interface, generating modified executable code that is loaded onto the electronic controller and again monitoring the operation of the electronic controller, and repeating this step until the electronic controller is operating satisfactorily on the physical plant receiving the reference input.

40. A method as recited in claim 39 further comprising the step of:

using the electronic controller with the modified executable code to control the output from a plant receiving a real input after the electronic controller is operating satisfactorily on the plant receiving the reference input.

41. A method for developing and operating an active sound or vibration control system comprising the steps of:

displaying a generalized control model diagram on a screen, the generalized control model diagram being comprised of parts that represent a generalized adaptive control model and parts that represent aspects of a generalized plant simulation;

modifying the generalized control model diagram by adding, deleting, or moving parts of the generalized control model diagram on the screen to create a tailored control model diagram on the screen;

prompting a user to enter information through a user interface, the information pertaining to one or more parts in the tailored control model diagram to develop a customized adaptive control model and to develop a customized simulated plant;

generating customized executable code in accordance with the information entered by the user; and operating the electronic controller in accordance with the customized executable code so that the electronic controller can simulate operation in accordance with the customized adaptive control model and the customized plant simulation.

\* \* \* \* \*